United States Patent
Gong et al.

(10) Patent No.: US 12,517,839 B2
(45) Date of Patent: Jan. 6, 2026

(54) METHOD AND SYSTEM FOR DATA VIRTUALIZATION WITH SMART CACHE RECOMMENDATION USING AN ADVANCED QUERY ACCELERATION (QuAcc) LAYER

(71) Applicant: Dell Products L.P., Round Rock, TX (US)

(72) Inventors: Min Gong, Shanghai (CN); Flavio Paiva Junqueira, Barcelona (ES); Arthur F. Lent, Newton, MA (US); Qicheng Qiu, Shanghai (CN); Chetan Pudiyanda Somaiah, Bangalore (IN); Ravi Shankar Raja, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/495,985

(22) Filed: Oct. 27, 2023

(65) Prior Publication Data

US 2025/0139018 A1     May 1, 2025

(51) Int. Cl.
*G06F 12/12*     (2016.01)
*G06F 9/451*     (2018.01)

(52) U.S. Cl.
CPC .............. *G06F 12/12* (2013.01); *G06F 9/451* (2018.02)

(58) Field of Classification Search
CPC ................................. G06F 12/12; G06F 9/451
See application file for complete search history.

(56) References Cited

U.S. PATENT DOCUMENTS

| | | | | |
|---|---|---|---|---|
| 5,907,837 A | * | 5/1999 | Ferrel | G06F 16/9574 |
| 2005/0192922 A1 | * | 9/2005 | Edlund | G06F 16/24552 |
| 2021/0092022 A1 | * | 3/2021 | Kantamneni | H04L 67/10 |

* cited by examiner

*Primary Examiner* — Khanh B Pham
*Assistant Examiner* — Brooks T Hale
(74) *Attorney, Agent, or Firm* — Chamberlain, Hrdlicka, White, Williams & Aughtry; Aly Z. Dossa

(57) ABSTRACT

A method for managing data items includes: obtaining a query log; initiating performance of a first recommendation cycle (RC) by analyzing the query log to generate a recommendation list (RL) including at least a data item with a high-level cache reward; providing the RL to an administrator via a graphical user interface (GUI); providing an administrator-confirmed recommendation list (ACRL) to a cache engine, in which the ACRL is received from the administrator in response to the RL being provided to the administrator; receiving a refreshment policy of the data item included in the ACRL from the administrator; storing, based on the ACRL, the data item as a cached data item in a storage device.

20 Claims, 27 Drawing Sheets

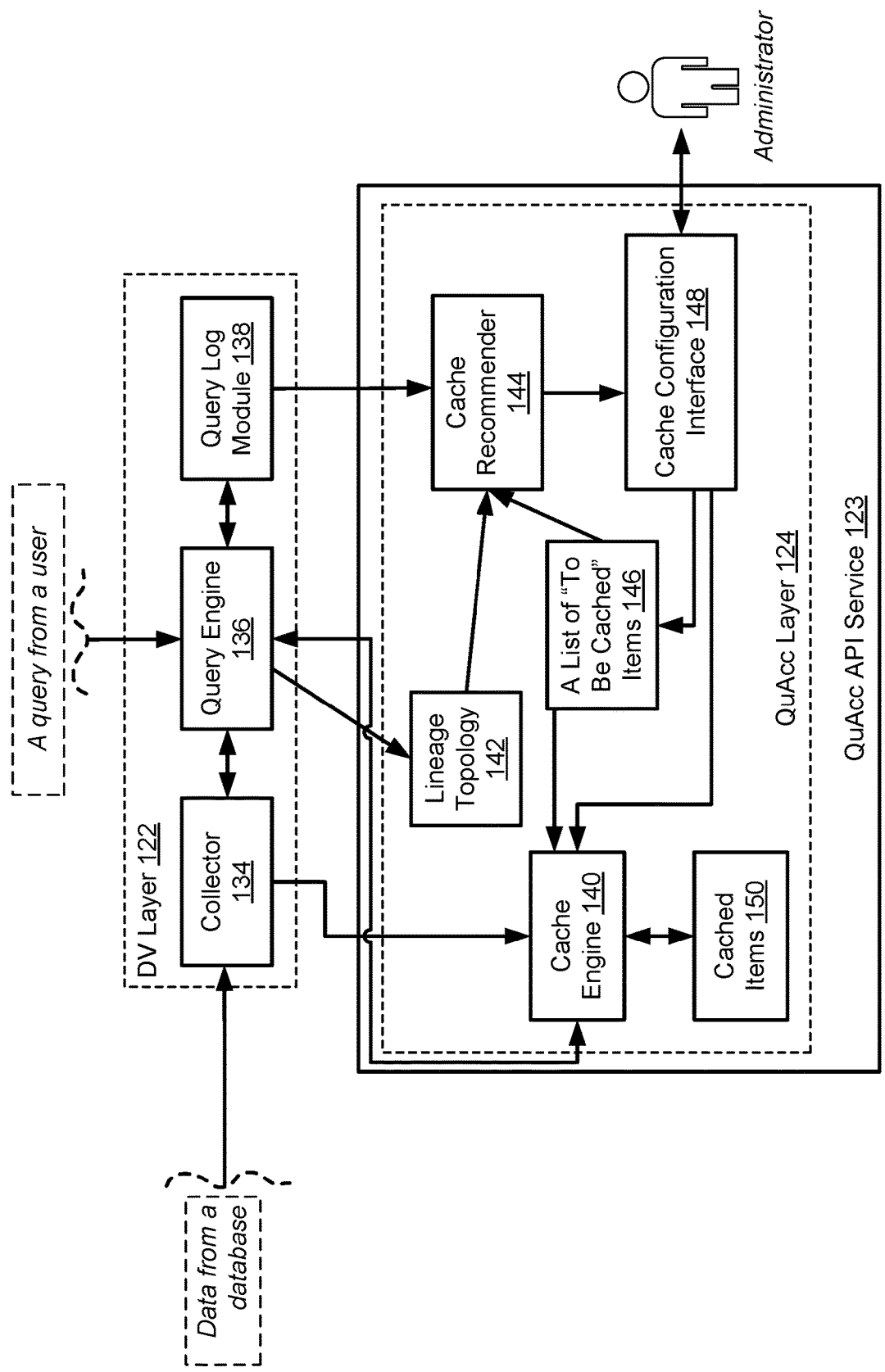
FIG. 1.2

*Attributes of a node (Node 3):*

<u>Topological attributes (initialized when constructing the graph):</u> n.idx (an identifier of a node) = 3
n.type (a type of the node) = "view"
n.level (the smallest depth of the node from the source) = 1
n.in (upstream nodes of the node) = [1, 2]
n.out (downstream nodes of the node) = [4, 5, 6]
n.indegree (the count of "n.in") = 2
n.outdegree (the count of "n.out") = 3

<u>Behavioral attributes (calculated from query logs):</u> n.time_cost (time cost of executing a query statement of the node) = 100 ms
n.frequency (a "normalized" frequency of the invokes of the node) = 10 Hz
n.size (a size of data produced by the node) = 100 kB <u>Status variables (no value until being used in a recommendation procedure):</u> n.remoteTran_size (a size of data to be transferred from the source)
n.latency (a duration that a user need to wait to get query results)
n.reward (an advantage of caching the node)
n.reward_last_cycle (a reward of the node in the last recommendation cycle)
n.cacheFlag (whether or not the node is cached)

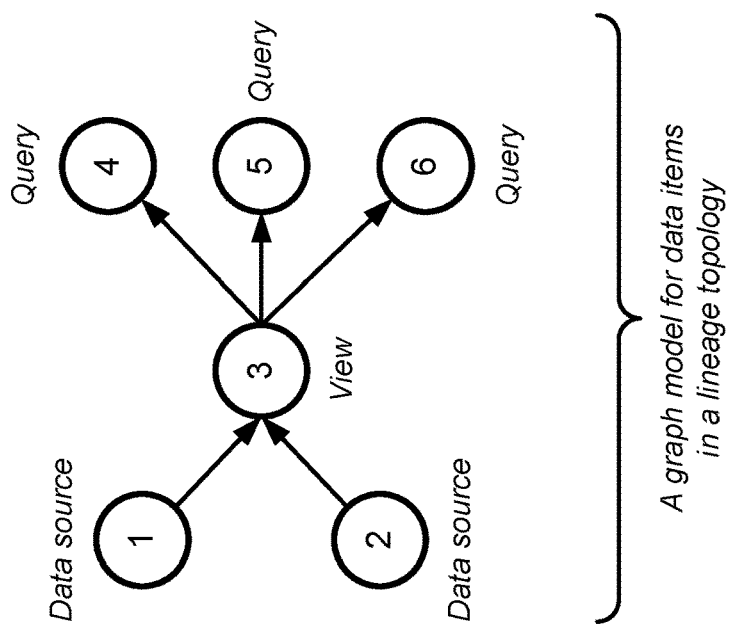

A graph model for data items in a lineage topology

FIG. 3

*A recommendation procedure*

Input: A lineage topology, a query log, the current recommendation cycle "t"
Output: A list of recommended "to be cached" data items "rcmd(t)"

--

1. Construct G(N, E) using a lineage topology
2. For each $n_i$ of N:
3.     calculate $n_i$.size and $n_i$.time_cost using a query log
4. For each $n_i$ of N:
5.     if $n_i$.type == "query", then calculate $n_i$.freq using the query log
6.     else $n_i$.freq = 0
7. Q = $n_i | n_i$ of N && $n_i$.type == "query"
8. while Q is not empty
9.     $n_i$ == Q.pop()
10.     for each $n_j$ of $n_i$.in
11.         $n_j$.freq += $n_i$.freq
12. if t == 0
13.     for each $n_i$ of N && $n_i$.level > 0
14.         $n_i$.reward = 0, $n_i$.reward_last_cycle = 0
15.         $n_i$.cacheFlag = 0, $n_i$.latency = 0, $n_i$.remoteTran_size = 0
16.         if $n_i$.level == 1
17.         then $n_i$.remoteTran_size = $n_i$.size
18.             $n_i$.latency = (data source node response time) + ($n_i$.time_cost)
19. rcmd(t) = update_cache_reward (G(N, E), t)
20. Return rcmd(t)

FIG. 4

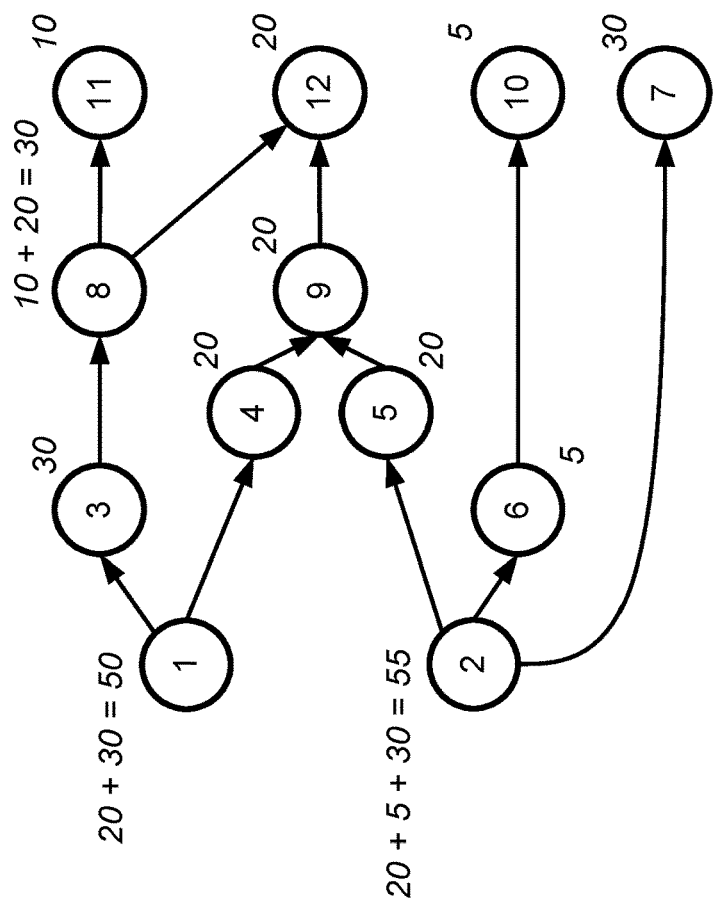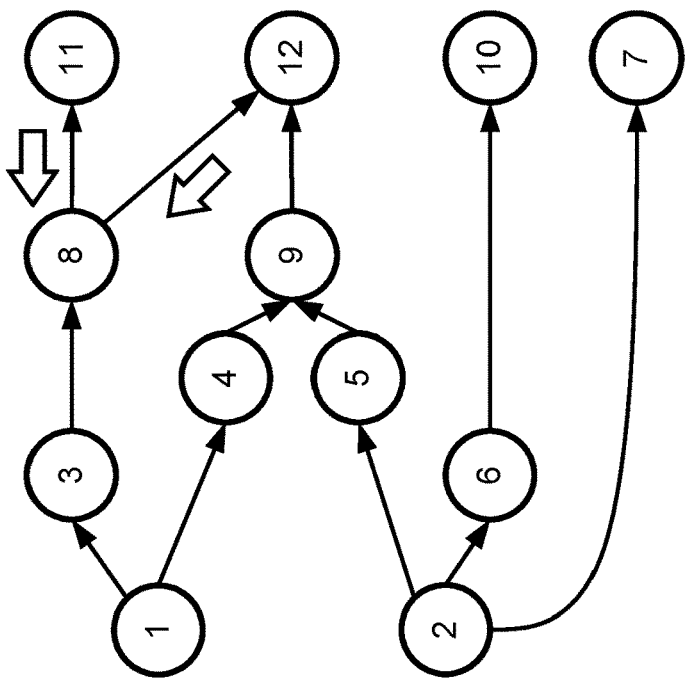
FIG. 5

*A process to update a cache reward (simple)*

```
Input: G(N, E) with a stored status, the current recommendation cycle "t"
Output: An updated status of G(N, E) at cycle "t", a list of recommended
cache items "rcmd(t)"

--

1. For each $n_i$ of N && $n_i$.type != "source"
2.     $n_i$.reward == $n_i$.freq
3. Sort N by N.reward in a descending order
4. Select the top K node from N, set their flag $n_i$.cacheFlag = 1
5. Return a list of $n_i | n_i$.cacheFlag == 1
```

FIG. 6.1

*A process to update a cache reward (advanced)*

```
Input: G(N, E) with a stored status, the current recommendation cycle "t"
Output: An updated status of G(N, E) at cycle "t", a list of recommended cache
items "rcmd(t)"

--

1. For each level from 1 to max (node level)
2.      For each n_i of N && n_i.level == level
3.          if n_i.level != 1
4.              n_i.latency = max (n_j.latency × (1 − n_j.cacheFlag)) + n_i.time_cost
5.              n_i.remoteTran_size = ∑_(nj of ni.in)(n_j.remoteTran_size × (1 − n_j.cacheFlag))
6.              n_i.reward = B_time(n_i.freq × n_i.latency) + B_tf(n_i.freq × n_i.remoteTran_size)
7.      Sort a list of n_i|n_i.level == level by n_i.reward in a descending order
8.      Select the top K node from the list, set their flag n_k.cacheFlag = 1
9.      LocalStorageCost += ∑_(ni.level == level)(n_i.size × n_i.cacheFlag)
10. if LocalStorageCost > tolerance
11.     Sort the list of n_i|n_i.cacheFlag == 1 by n_i.reward in an ascending order
12.     while (LocalStorageCost > tolerance)
13.         n_top = list.pop(), n_top.cacheFlag = 0
14.         LocalStorageCost −= n_top.size
15. else
16.     Sort the list of n_i|n_i.cacheFlag == 0 by n_i.reward in a descending order
17.     while (1)
18.         n_top = list.pop()
19.         LocalStorageCost += n_top.size
20.         if LocalStorageCost < tolerance
21.             n_top.cacheFlag = 1
22.         else break
23. Return the list of n_k|n_k.cacheFlag == 1
```

FIG. 6.2

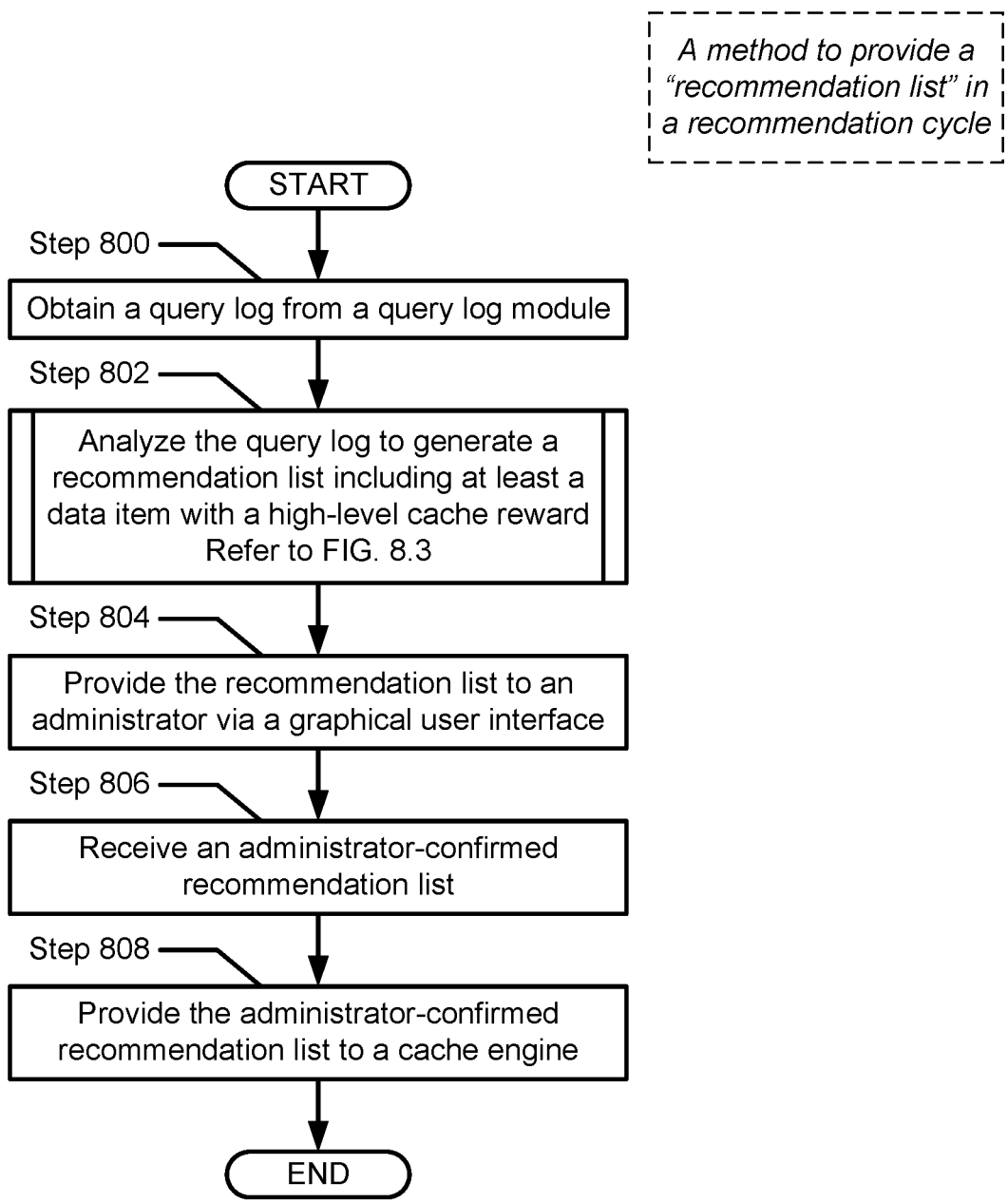
FIG. 8.1

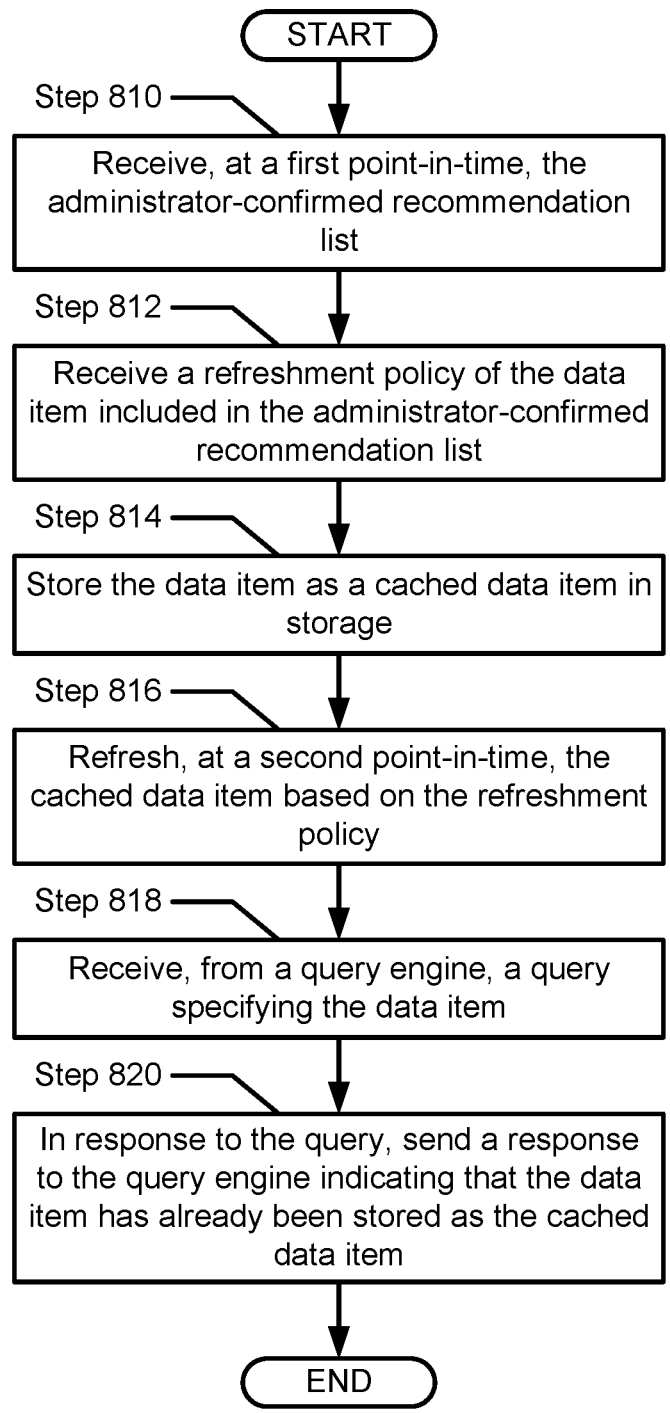
FIG. 8.2

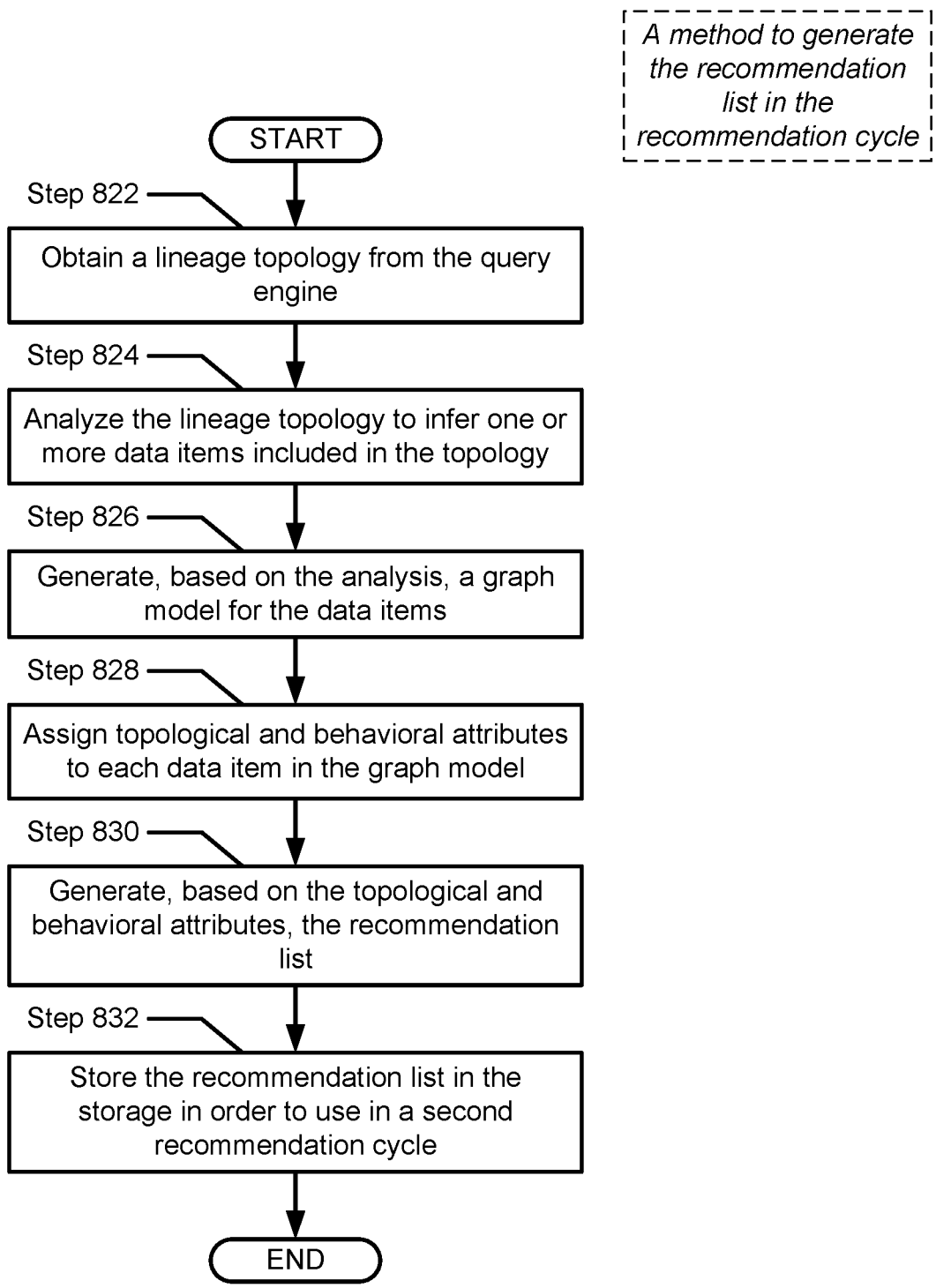
FIG. 8.3

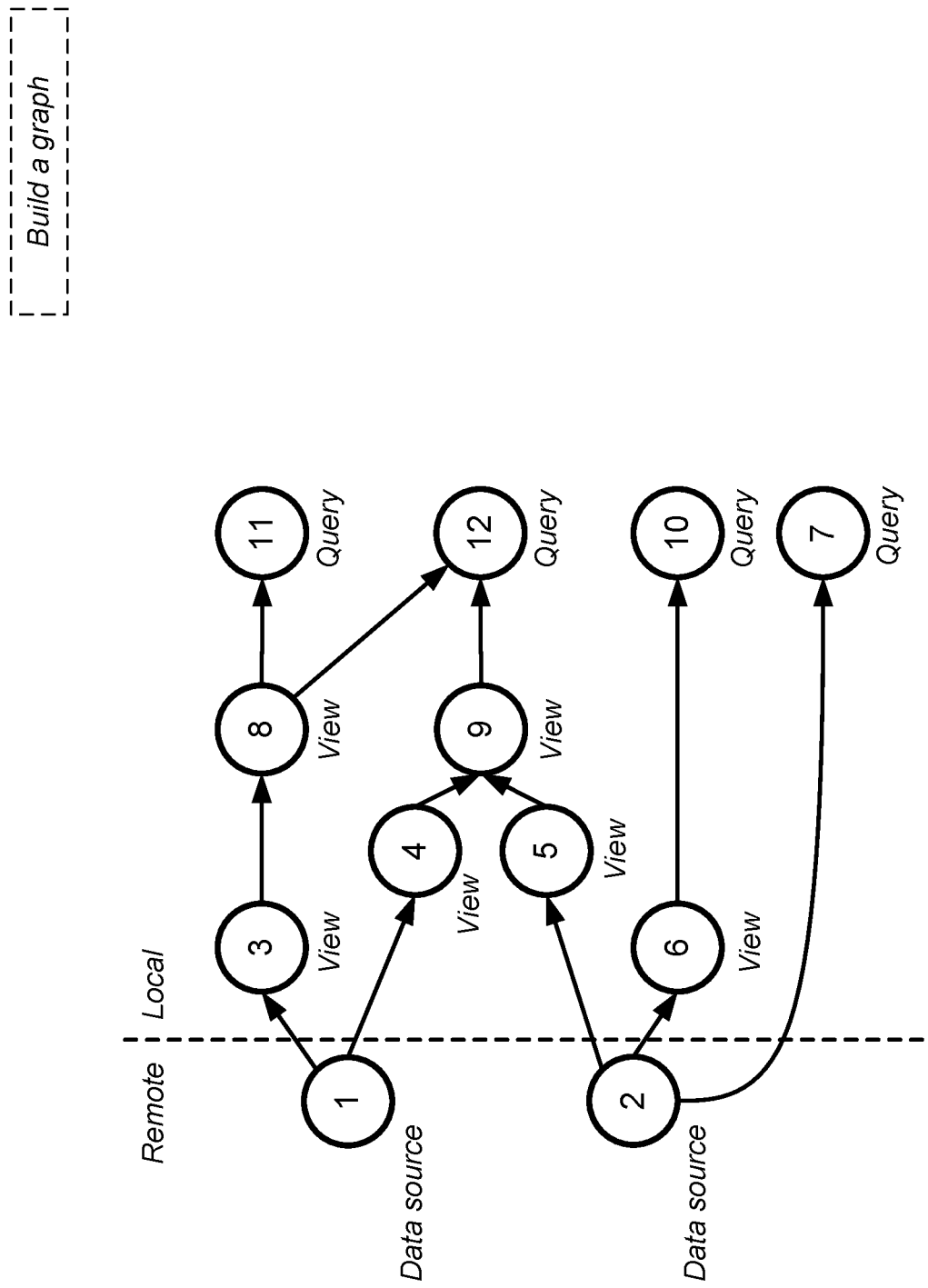
FIG. 9.1

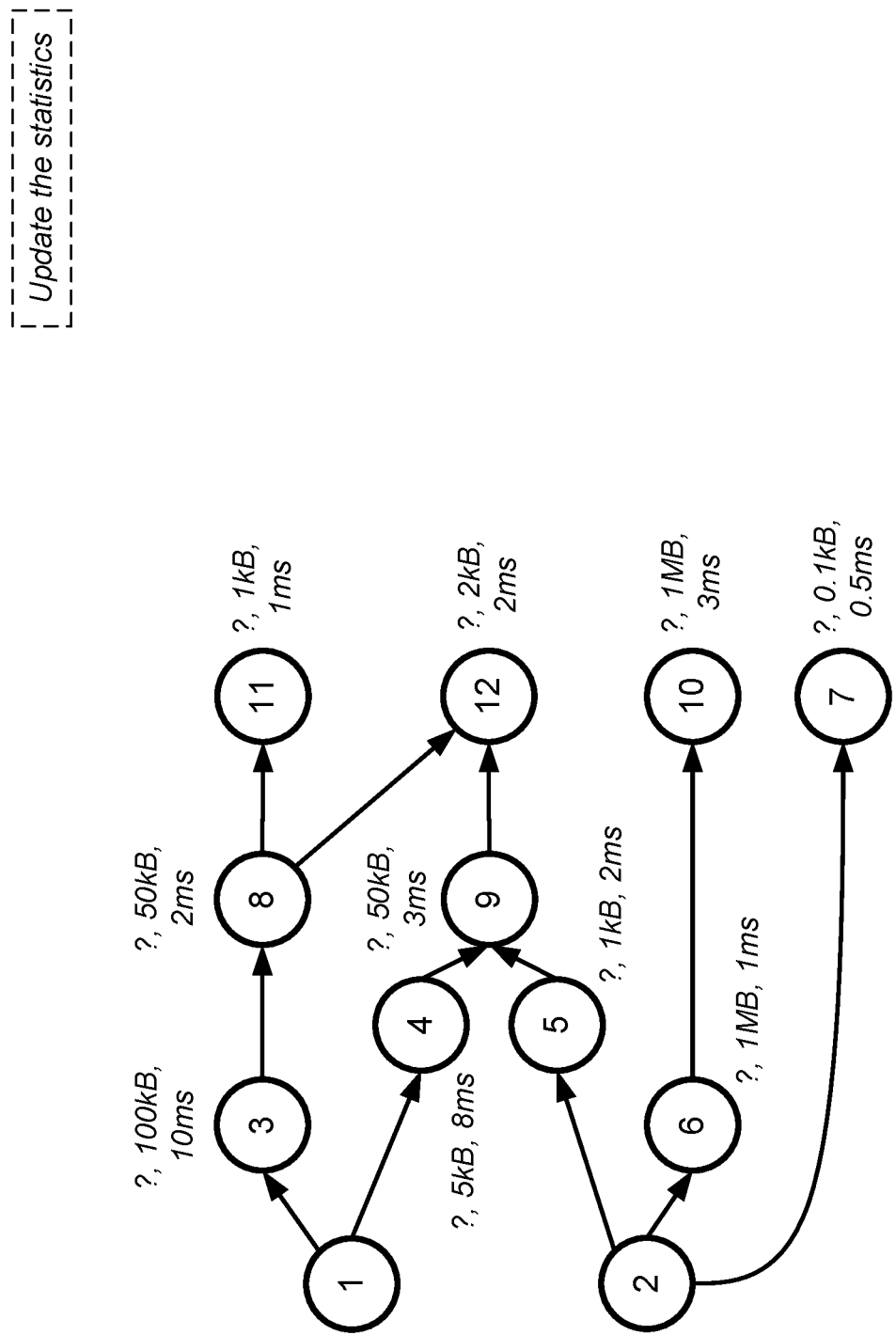
FIG. 9.2

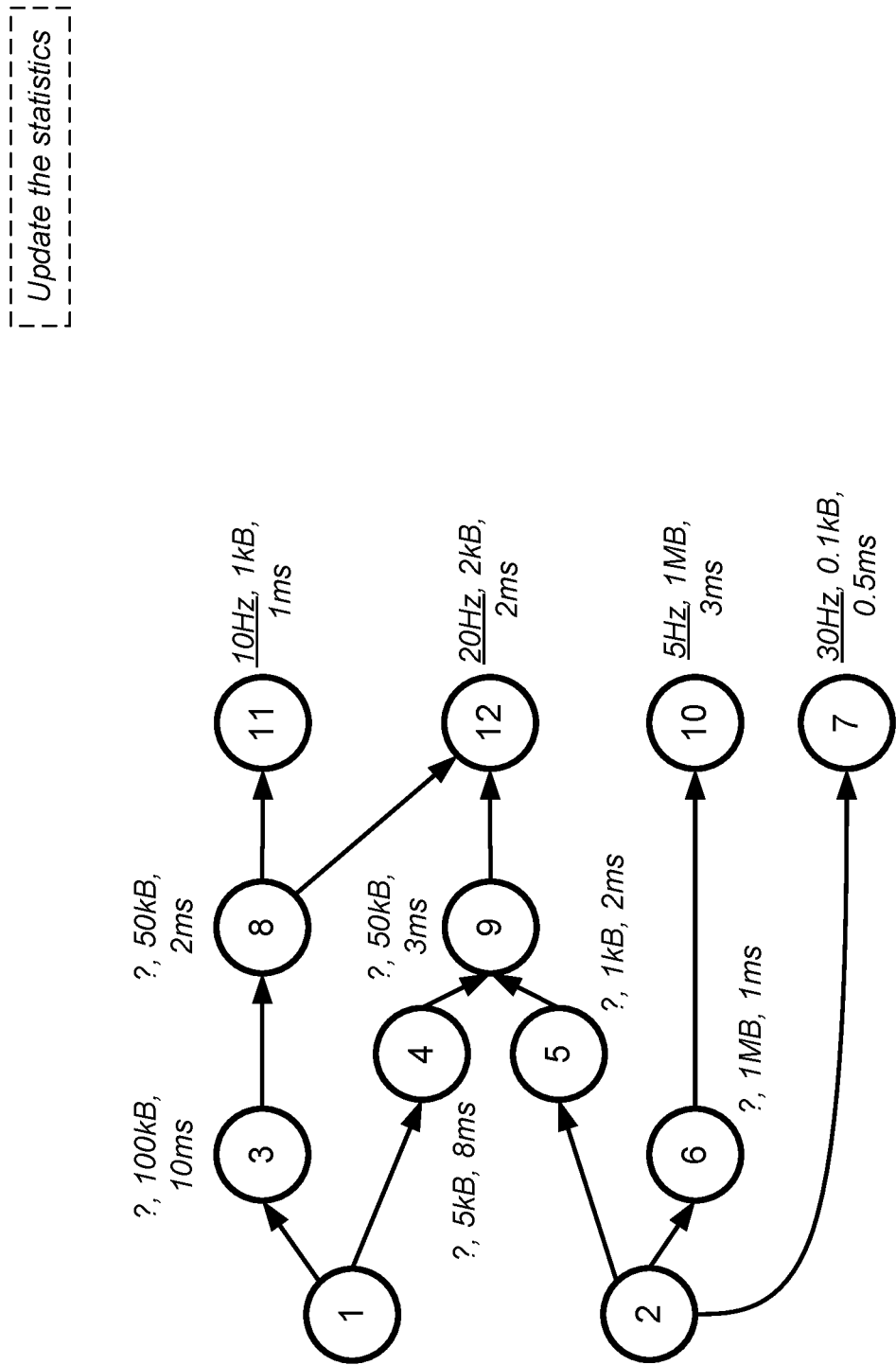
FIG. 9.3

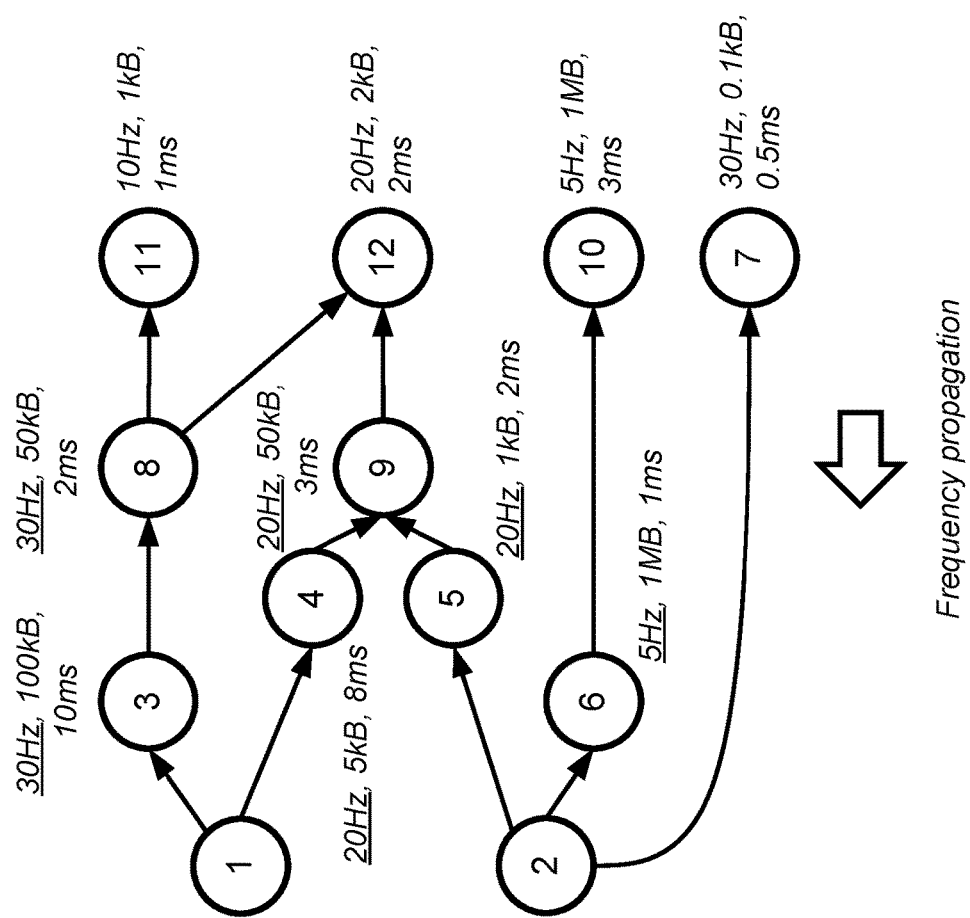
FIG. 9.4

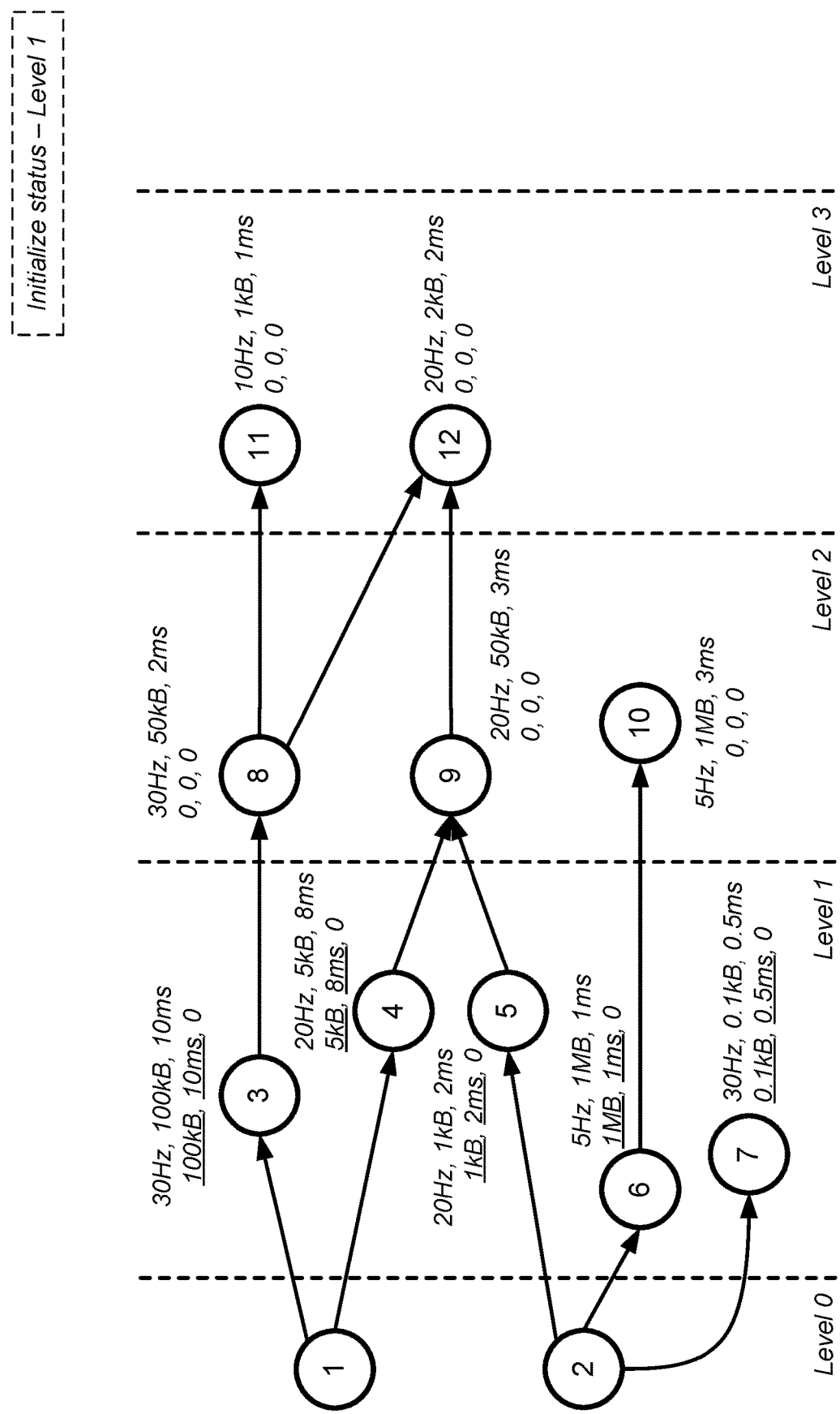
FIG. 9.5

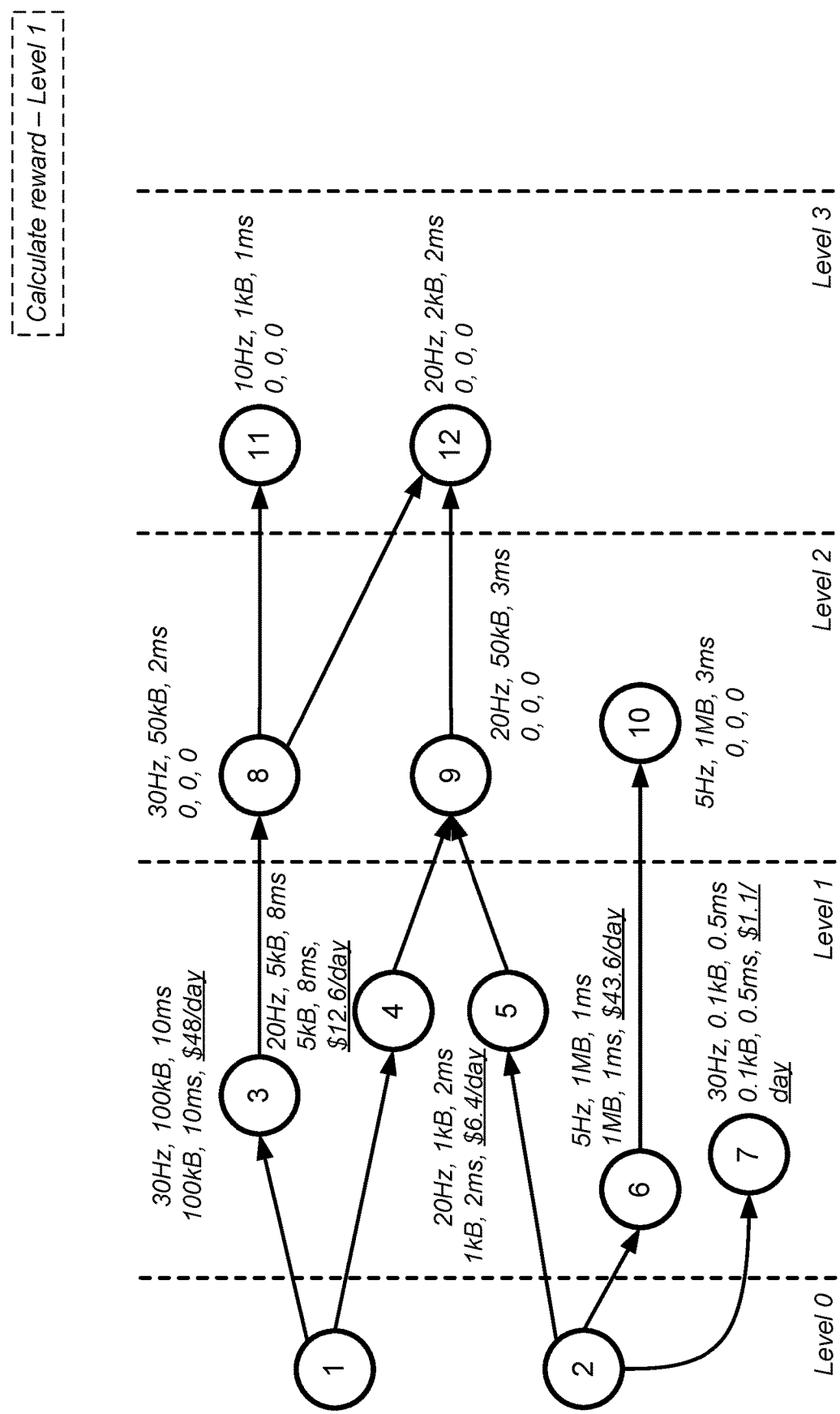
FIG. 9.6

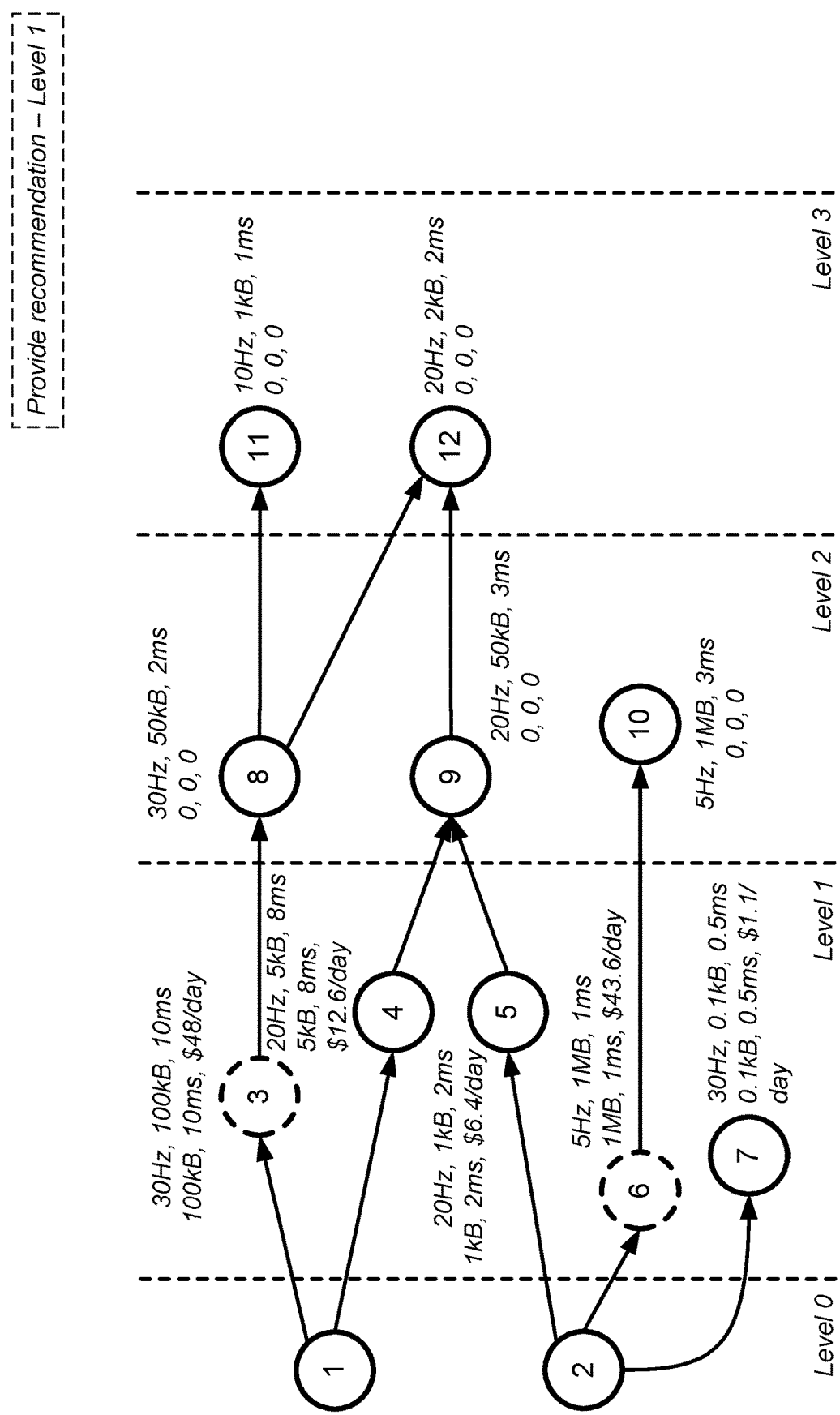
FIG. 9.7

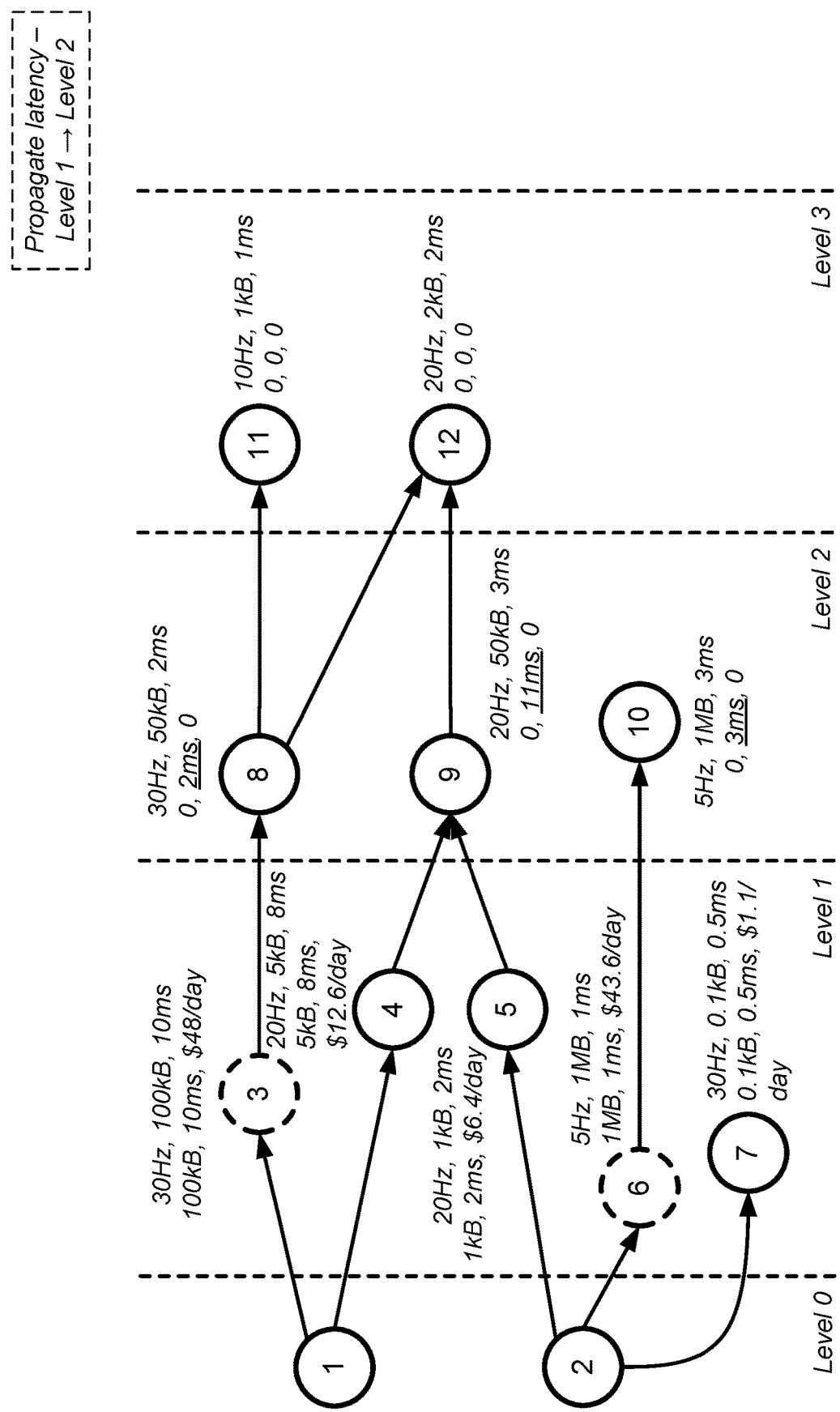
FIG. 9.8

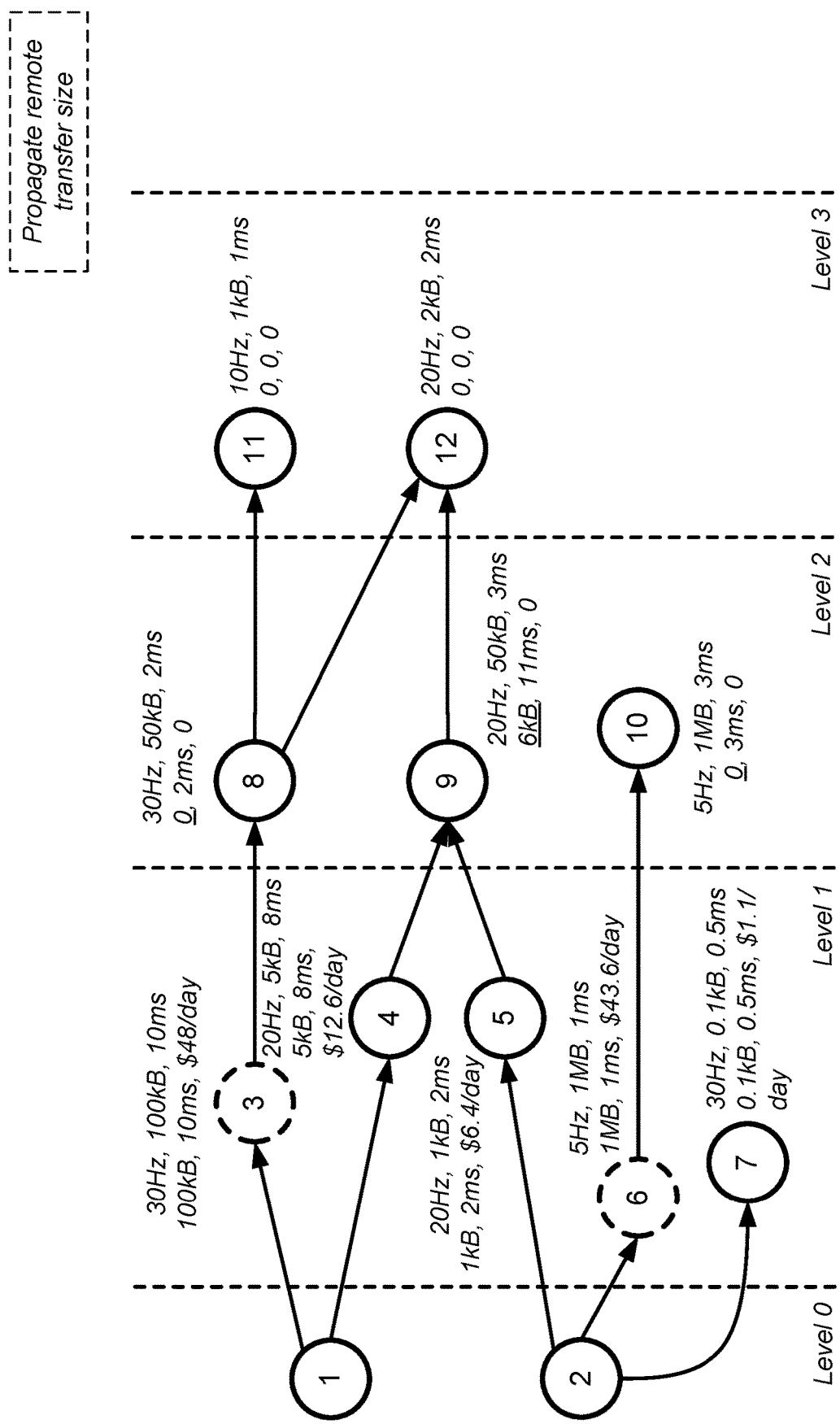
FIG. 9.9

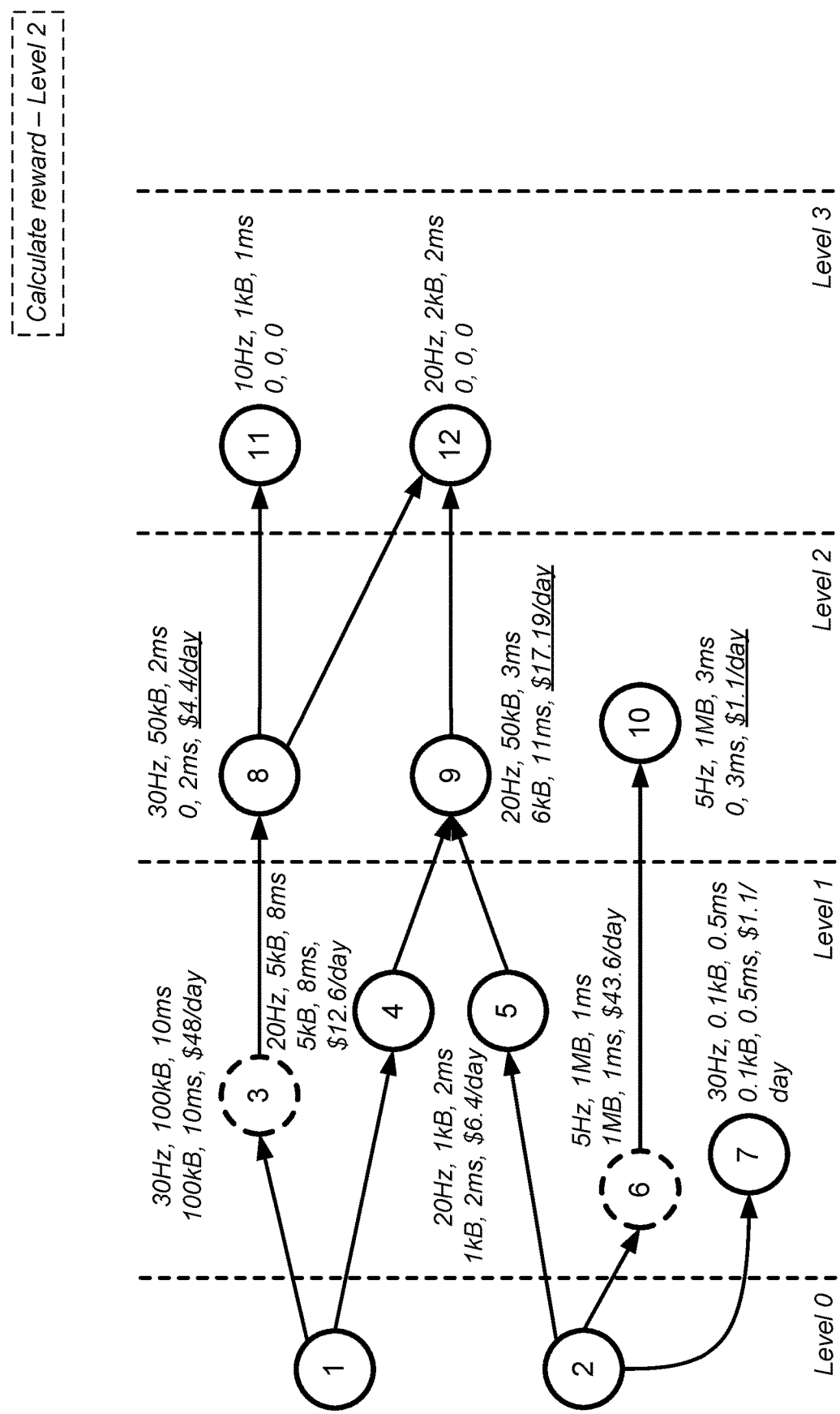
FIG. 9.10

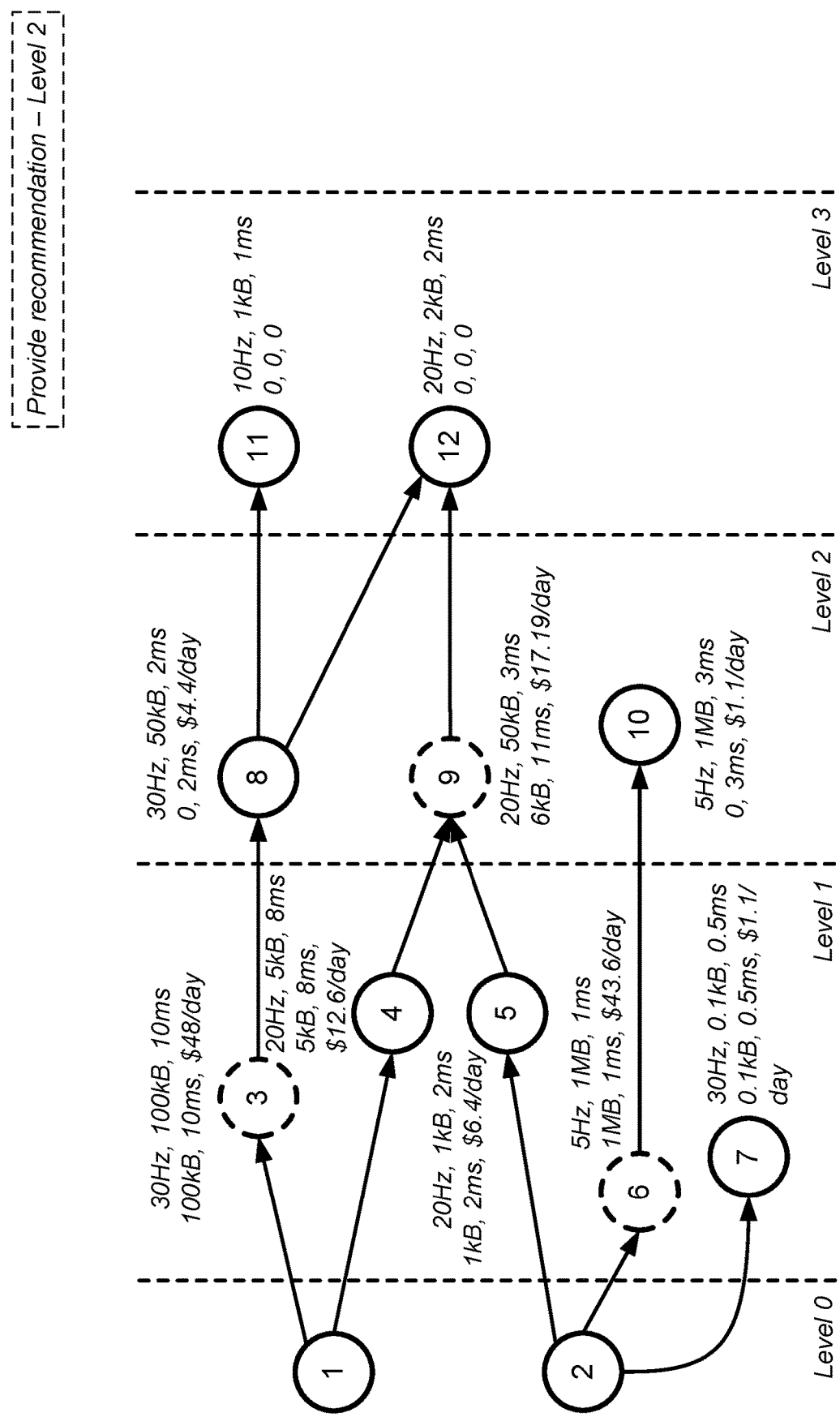
FIG. 9.11

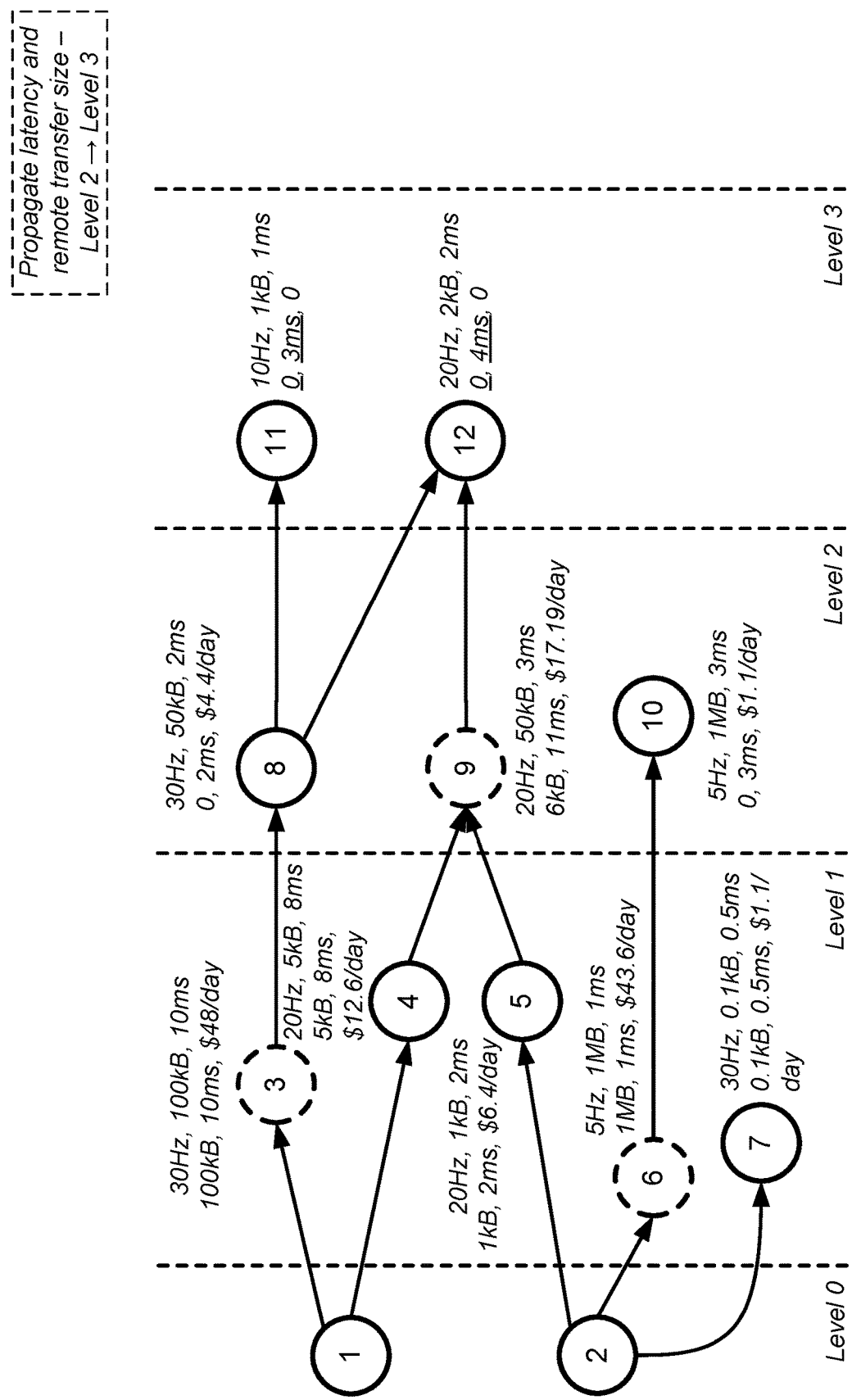
FIG. 9.12

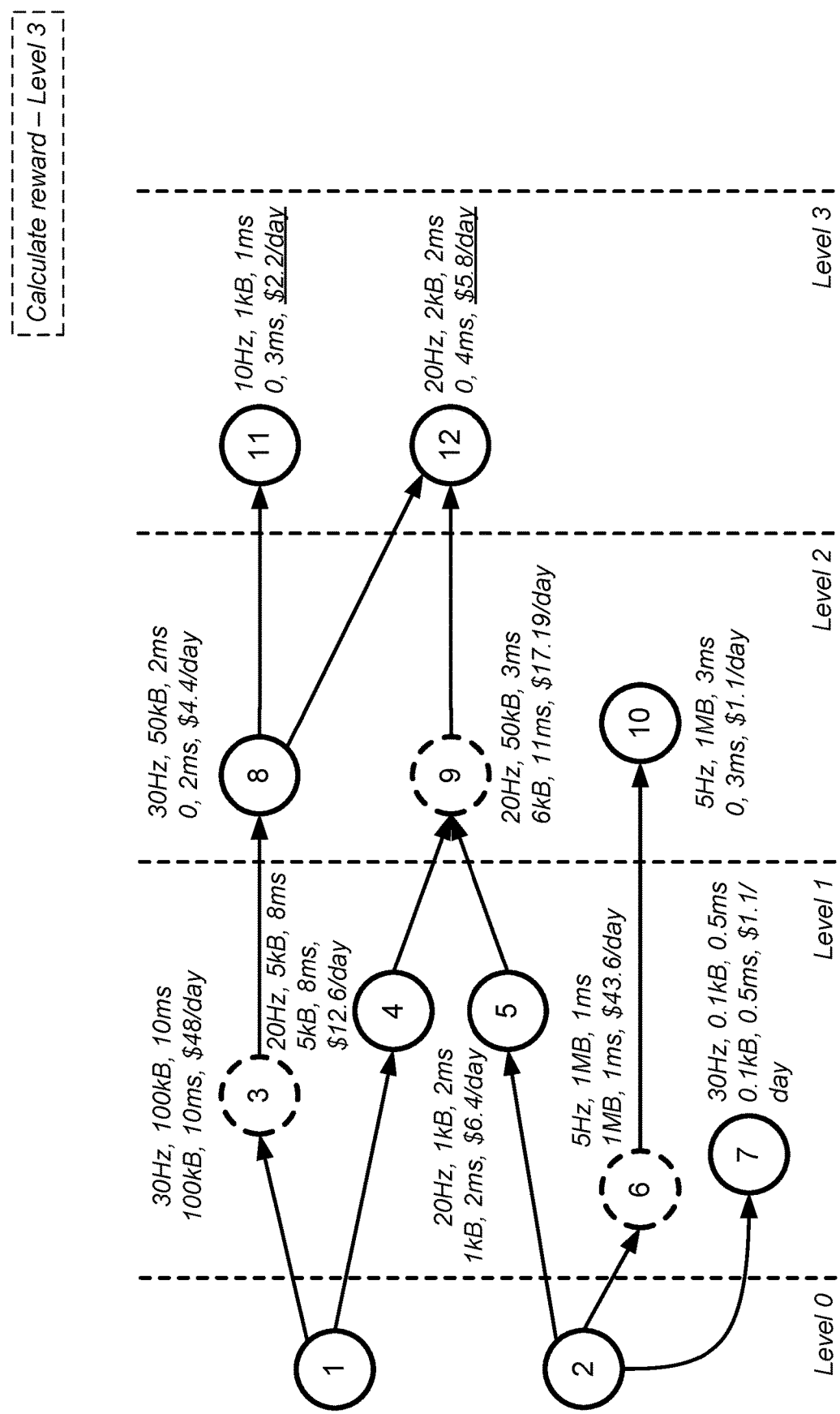
FIG. 9.13

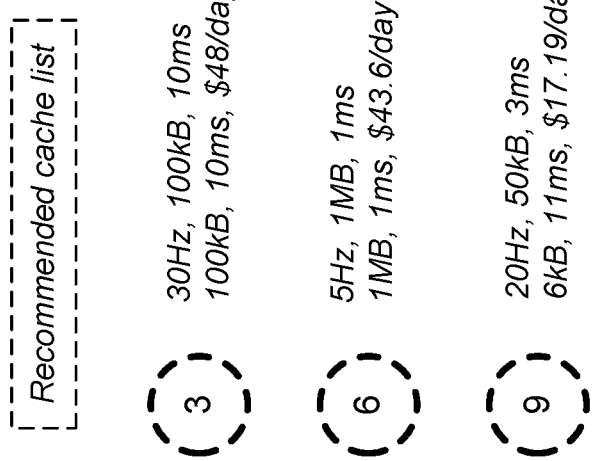
FIG. 9.14

METHOD AND SYSTEM FOR DATA VIRTUALIZATION WITH SMART CACHE RECOMMENDATION USING AN ADVANCED QUERY ACCELERATION (QuAcc) LAYER

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.2 shows components of a data virtualization (DV) layer and a QuAcc layer in accordance with one or more embodiments of the invention.

FIG. 3 shows a graph model for data items in a lineage topology and attributes of a data item in accordance with one or more embodiments of the invention.

FIG. 4 shows a recommendation procedure in accordance with one or more embodiments of the invention.

FIG. 5 shows an illustration of a frequency backward propagation in accordance with one or more embodiments of the invention.

FIG. 6.1 shows a simple process to update a cache reward in accordance with one or more embodiments of the invention.

FIG. 6.2 shows an advanced process to update a cache reward in accordance with one or more embodiments of the invention.

FIG. 8.1 shows a method to provide a recommendation list in a recommendation cycle in accordance with one or more embodiments of the invention.

FIG. 8.2 shows a method to manage a data item in accordance with one or more embodiments of the invention.

FIG. 8.3 shows a method to generate a recommendation list in a recommendation cycle in accordance with one or more embodiments of the invention.

FIGS. 9.1-9.14 show an example use case in accordance with one or more embodiments of the invention.

DETAILED DESCRIPTION

Figure 1:
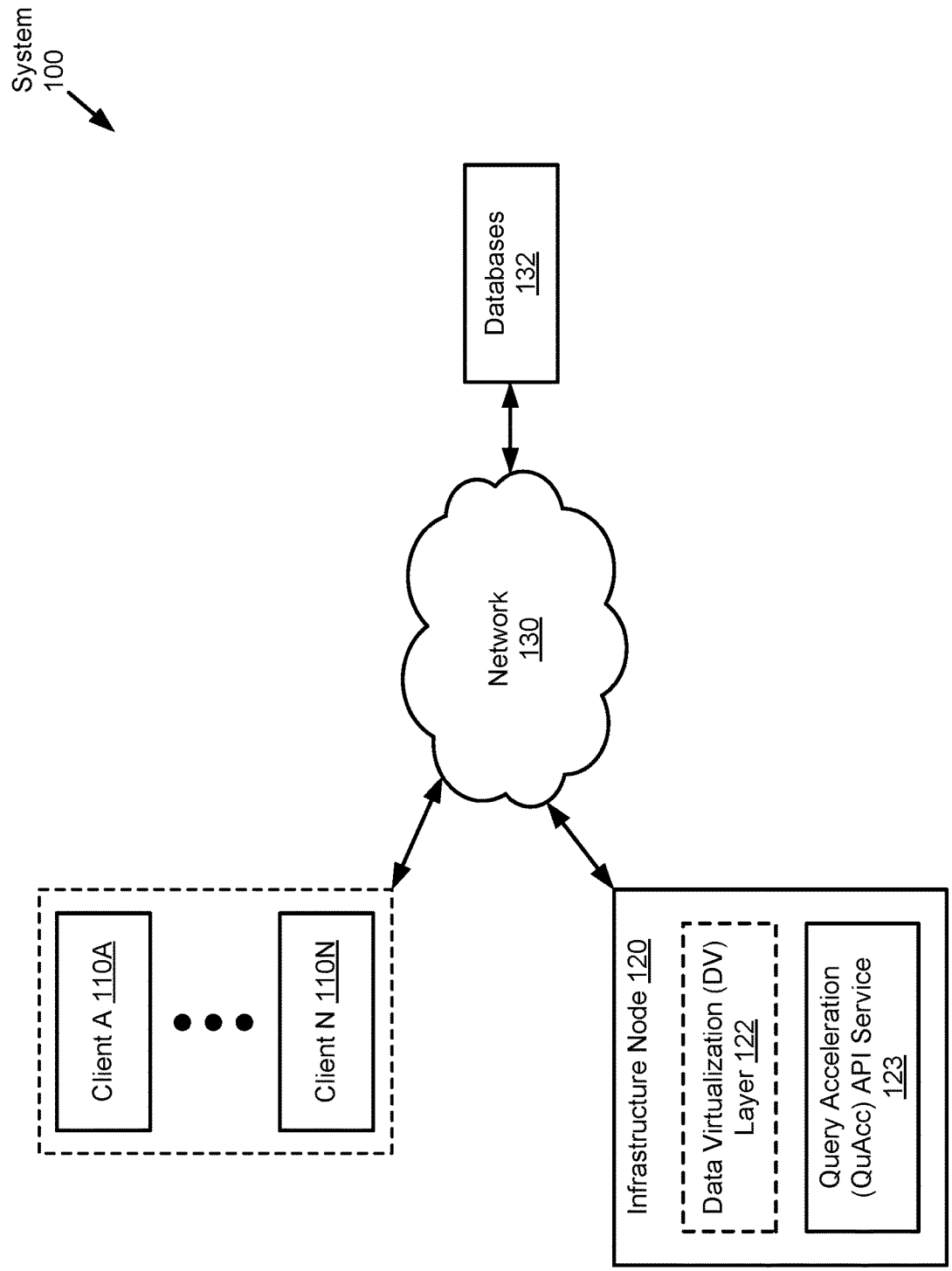
FIG. 1.1 shows a diagram of a system in accordance with one or more embodiments of the invention.

Specific embodiments will now be described with reference to the accompanying figures. Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, DV is used for data integration that enables processing of data from multiple data sources without physically moving or copying the data. DV may allow an application and/or a user/administrator to retrieve and manipulate data (i) without requiring technical details of the data (e.g., how the data is formatted at the data source, where the data is located, etc.) and (ii) in a unified, abstracted, organized, and encapsulated manner when the data is retrieved from various different data sources (e.g., data warehouses, data lakes, cloud-based devices, edge devices, etc.). DV may target an aggregated, consistent, and holistic representation of data from different data sources and serve interactive, long-executing, and/or ad-hoc queries (e.g., a user may execute an interactive query where the user expects a response to that query in a short period of time, a user may execute a long-executing query where the user eventually receives a response to that query, a user may execute ad-hoc queries for data exploration purposes, etc.).

In most cases, a DV layer (or a DV service) may link two or more data sources in various forms, enabling data aggregation across all such sources (where the DV layer may make a remote data query directly available to users). Users (or data users) may retrieve and access a data of interest through the DV layer instead of depending on information technology (IT) experts to develop the corresponding data service. From an infrastructure perspective, the DV layer may pull data from different data sources to process, thereby reducing data movement among those sources. As used herein, data users may refer to a process step (or an entity) consuming data such as end-users (e.g., data scientists, data analysts, etc.) and downstream data applications (e.g., aggregation queries from business intelligence (BI) tools such as Tableau, PowerBI, etc.).

In most cases, a DV layer may manage "views" that are logical tables defined by a query (e.g., a structured query language (SQL) statement that includes logic to get data from a remote data source), in which the query may be considered as a data process definition including "extract, transform, and load" (ETL) and the views may be referenced by future queries. A view may be a mapping of an identifier to an SQL statement and may not directly maintain any data, and a query associated to the view may be executed once another query referencing it is executed. To accelerate queries, conventional approaches may consider storing/persisting execution results of views in local storage so that future queries referencing a corresponding view may be accelerated, in which when a view's execution results is persisted/cached, that view may be called as a "materialized view." Usually, generating and updating a materialized view may require considering data consistency to ensure a synchronization between a result set and a remote data source.

Further, for DV-included remote and/or local systems, more factors may need to be considered such as a network data transfer factor (e.g., a bandwidth (BW) of a communication channel, a security level of that channel, a location of a remote data source, a type of the data source, cost of transferring data from the data source, etc.), in which some of the existing DV implementations (e.g., Starburst, Dremio, etc.) may consider such features for their own cache optimizations. These implementations may require cache configurations (e.g., configurations to store data (or data items) (e.g., views, queries, query execution results, etc.) resulting from a remote source locally) and cache refreshment policies (e.g., a refreshment schedule of cached data, where the cached views and/or query execution results may need to be refreshed/updated to prevent data staleness) to be set manually (e.g., depending on an administrator's experience). Additionally, to accelerate queries (in particular, queries accessing data located on remote data sources), the aforementioned existing implementations (e.g., "Cached Views" in Starburst, "Reflections" in Dremio, etc.) may allow users to store specific data items locally and refresh those data items according to a predetermined schedule.

For example, as being an existing implementation, Dremio's caching approach (e.g., an approach to denote a mechanism of storing table data (e.g., data that is stored as a table so that SQL can use the data) locally) may apply the following workflow: (i) in a DV layer, a user (e.g., a data engineer, an administrator, etc.) defines one or more views according to business requirements, in which (a) the views can fetch data (e.g., tables) from remote data sources, (b) the views are only logical tables and do not contain any data, and (c) a query associated to a view of the views would be executed once another query referencing it is executed (e.g., the administrator may invoke fetching data from the data sources and then a view may be used by corresponding queries); (ii) a user can define some of the views as "cached views" and specify their refreshment policies, in which (a) these views become materialized as "materialized views", (b) materialized views can query data from the data sources, (c) to ensure the queries access the latest data, the administrator needs to define a corresponding refreshment schedule so that the "remote" data would be refreshed according to the schedule; (iii) both cached views and refreshment policies are used to configure a "cache engine", in which the cache engine refreshes the cached views and stores one or more data items to local storage; and (iv) a query engine derives layouts/plans with respect to user queries and executes them, in which the query engine implements a verification process with a user's configuration such that if a user query references one or more views that have already been defined as "cached views" in (ii), the query engine will not fetch the corresponding data items from the data sources, and instead will fetch the data items directly from the local storage (in this way, the query may be accelerated comparing to a remote data fetch process, which is often slower due to high network latency and low network BW).

However, referring to the aforementioned workflow, caching approaches employed by existing DV implementations suffer from a major issue, that is all the cache-related configurations are manually set. For example, an administrator may need to select one or more views as cached views manually and/or may need to set a materialized view manually (because the administrator needs to explicitly define the materialized view). In most of the current user/customer data scenarios, data sources and views may have complicated ETL logic and lineage topology (e.g., interconnections and associations among data sources, views, and queries, indicating data processing relationships and dependencies among them). The lineage topology may be a large graph model where the administrator may need to rely on his/her experience and/or unclear vendor-specified configuration guidelines to select appropriate views to cache. As yet another example, the administrator may need to define a refreshment policy for each cached view manually, otherwise cached views will not be updated until the next query is executed. A cached view update may set to occur periodically, where the corresponding period may depend on an update performed on a data source and one or more downstream query requirements. All these aspects may need to be considered by the administrator.

As yet another example, once a definition of a view is changed (e.g., once a corresponding SQL statement is changed), the administrator may need to update the configuration manually (e.g., when a view has been selected as a materialized view, the administrator may need to update the view as a materialized view manually (by adding "create materialized view <name> as <query>" into the SQL statement, in which the "<query>" command determines the content of the materialized view)). Even if no change has occurred to the views, the administrator may still need to maintain configurations of the views (e.g., materialized or not materialized) regularly because a user may change the SQL statement over time. Consider a scenario where a view has been used by a BI dashboard and the administrator selects that view as a cached view because the dashboard needs to be refreshed every five minutes. If the dashboard changes its refreshment frequency to twelve hours, then the view is no longer a "hot" view and because of that, the administrator may retag the view as a "non-cached" view or at least change its refreshment policy to a lower frequency.

Further, as indicated above, configuration guidelines are based on the query behavior in a given system. The aforementioned implementation (e.g., Dremio's caching approach/implementation) may operate well if the administrator is experienced, or the administrator may utilize conventional tools/scripts to analyze historical behavior/pattern of queries, in which those tools/scripts are ad-hoc and outside of the DV layer.

As yet another example and as being another existing implementation, Starburst's "Warp Speed" implements acceleration via caching and indexing locally to one or more processing nodes. More specifically, Warp Speed caches (locally) raw data from object storage directly to high-performance storage attached to one or more computing devices in a cluster. Warp Speed may (i) manage data from object splits as a row group and store the row group in a columnar block caching format and (ii) cache the raw data to accelerate queries (which is orthogonal to the approach presented in this disclosure, in which the presented approach stores intermediate results of processed data (e.g., referenced views or query results) if the results are frequently reused by users and/or downstream applications).

For at least the reasons discussed above and without requiring resource (e.g., time, engineering, etc.) intensive efforts, a fundamentally different approach is needed (e.g., an approach that implements a QuAcc layer that recommends "to be cached" data items/candidates (e.g., views, queries, query execution results, etc.) and refreshment policies of those candidates to optimize cache utilization (by considering, for example, a lineage topology of the data items). The approach may support existing DV implementations while incorporating novel components and/or methods. More specifically, the approach may utilize: (i) a "cache recommender" that provides administrators a list of data items with high-cache rewards (based on historical query logs); (ii) a "cache engine" that refreshes a cache content according to administrator-defined refreshment policies; (iii) a "cache configuration interface" that allows an administrator to determine optimal cache candidates and set appropriate refreshment policies, in which the interface allows the administrator to obtain insights on the historical query logs and refreshment policy impact, and helps the administrator to infer one or more benefits and/or trade-offs of different options; and (iv) an "application programming interface (API) service component" that packages all QuAcc functionalities as a service, which may be provided via a virtual desktop infrastructure (VDI).

Embodiments of the invention relate to methods and systems for managing a QuAcc layer for DV. As a result of the processes discussed below, one or more embodiments disclosed herein advantageously ensure that: (i) one or more smart and functional cache recommendations are provided to users/administrators; (ii) cooperation/compatibility of the QuAcc layer with object storage and/or a common storage layer is enabled; (iii) cooperation of the QuAcc layer with other layers (e.g., a conventional DV layer) is enabled; (iv) the QuAcc layer can analyze historical behavior of queries via query logs obtained from a query log module; (v) the QuAcc layer can recommend a list of data items for caching to; (vi) administrators are allowed to decide and specify one or more caching configurations via the cache configuration interface so that the administrators can retain control of the cached data items and their (a) content and (b) refreshment policies; (vii) the cache configuration interface enables the administrators to obtain insights on historical behavior of queries and impacts of one or more applied refreshment policies to provide a better administrator experience (e.g., to help the administrators with respect to understanding the benefits and trade-offs of different options towards making decisions more easily, which is not possible today); (viii) the QuAcc layer is packaged/provided as an API service so that the QuAcc layer may be used externally (e.g., to integrate the QuAcc layer with vendor software); (ix) views and results of query executions are considered as cache (or cacheable) candidates; (x) historical query logs are analyzed to calculate a corresponding cache reward of each cache candidate and based on their cache rewards, cache candidates are prioritized; (xi) recommendation of cache candidates is modelled as an optimization problem; and/or (xii) administrators do not need to invest most of their time and engineering efforts to manually set cache configurations and/or cache refreshment policies for a better product management and development.

The following describes various embodiments of the invention.

FIG. 1.1 shows a diagram of a system (100) in accordance with one or more embodiments of the invention. The system (100) includes any number of clients (e.g., Client A (110A), Client B (110B), etc.), any number of infrastructure nodes (e.g., 120), any number of databases (132), and a network (130). The system (100) may facilitate management and virtualization of data from any number of data sources (e.g., 132). The system (100) may include additional, fewer, and/or different components without departing from the scope of the invention. Each component may be operably connected to any of the other components via any combination of wired and/or wireless connections. Each component illustrated in FIG. 1.1 is discussed below.

In one or more embodiments, the clients (e.g., 110A, 110B, etc.), the infrastructure node (120), the databases (132), and the network (130) may be (or may include) physical or logical devices, as discussed below. While FIG. 1.1 shows a specific configuration of the system (100), other configurations may be used without departing from the scope of the invention. For example, although the clients (e.g., 110A, 110B, etc.) and the infrastructure node (120) are shown to be operatively connected through a communication network (e.g., 130), the clients (e.g., 110A, 110B, etc.) and the infrastructure node (120) may be directly connected (e.g., without an intervening communication network).

Further, functioning of the clients (e.g., 110A, 110B, etc.) and the infrastructure node (120) is not dependent upon the functioning and/or existence of the other components (e.g., devices) in the system (100). Rather, the clients and the infrastructure node may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing data) and may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of clients (e.g., 110A, 110B, etc.). The system (100) may also represent a comprehensive middleware layer executing on computing devices (e.g., 1000, FIG. 10) that supports application and storage environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using one or more clients (e.g., 110A, 110B, etc.)) and other computations remotely (e.g., away from the users' site using the infrastructure node (120)) from the users. By doing so, the users may utilize different computing devices that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110B, etc.) may include functionality to, e.g.: (i) capture sensory input (e.g., sensor data) in the form of text, audio, video, touch or motion, (ii) collect massive amounts of data at the edge of an Internet of things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the infrastructure node (120)), store, or otherwise utilize captured sensor data (and/or any other type and/or quantity of data), and/or (iv) provide surveillance services (e.g., determining object-level information, performing face recognition, etc.) for scenes (e.g., a physical region of space).

In one or more embodiments, clients (e.g., 110A, 110B, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients may correspond to computing devices that one or more users use to interact with one or more components of the system (100).

In one or more embodiments, a client (e.g., 110A, 110B, etc.) may include any number of applications (and/or content accessible through the applications) that provide computer-implemented application services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110B, etc.). In one or more embodiments, applications may be logical entities executed using computing resources of a client. For example, applications may be implemented as computer instructions stored on persistent storage of the client that when executed by the processor(s) of the client cause the client to provide the functionality of the applications described throughout the application.

In one or more embodiments, while performing, for example, one or more operations requested by a user, applications installed on a client (e.g., 110A, 110B, etc.) may include functionality to request and use physical and logical resources of the client. Applications may also include functionality to use data stored in storage/memory resources of the client. The applications may perform other types of functionalities not listed above without departing from the scope of the invention. While providing application services to a user, applications may store data that may be relevant to the user in storage/memory resources of the client.

In one or more embodiments, to provide services to the users, clients (e.g., 110A, 110B, etc.) may utilize, rely on, or otherwise cooperate with the infrastructure node (120). For example, clients may issue requests to the infrastructure node (120) to receive responses and interact with various components of the infrastructure node. Clients may also request data from and/or send data to the infrastructure node (for example, clients may transmit information (e.g., one or more SQL queries initiated by users) to the infrastructure node that allows the infrastructure node to perform computations, the results of which are used by the clients to provide services to the users). As yet another example, clients may utilize application services provided by the infrastructure node (120). When clients interact with the infrastructure node, data that is relevant to the clients may be stored (temporarily or permanently) in the infrastructure node.

In one or more embodiments, a client (e.g., 110A, 110B, etc.) may be capable of, e.g.: (i) collecting users' inputs (e.g., SQL queries), (ii) correlating collected users' inputs to the computer-implemented services to be provided to the users, (iii) communicating with the infrastructure node (120) that perform computations necessary to provide the computer-implemented services, (iv) using the computations performed by the infrastructure node to provide the computer-implemented services in a manner that appears (to the users) to be performed locally to the users, and/or (v) communicating with any virtual desktop (VD) in a VDI environment (or a virtualized architecture) provided by the infrastructure node (using any known protocol in the art), for example, to exchange remote desktop traffic or any other regular protocol traffic (so that, once authenticated, users may remotely access independent VDs). One of ordinary skill will appreciate that the client may perform other functionalities without departing from the scope of the invention.

In one or more embodiment, a VDI environment (or a virtualized architecture) may be employed for numerous reasons, for example (but not limited to): to manage resource (or computing resource) utilization, to provide cost-effective scalability across multiple servers, to provide a workload portability across multiple servers, to streamline an application development by certifying to a common virtual interface rather than multiple implementations of physical hardware, to encapsulate complex configurations into a file that is easily replicated and provisioned, etc.

As described above, clients (e.g., 110A, 110B, etc.) may provide computer-implemented services to users (and/or other computing devices). Clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110B, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the infrastructure node (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client cause the client to provide the functionality of the hypervisor.

In one or more embodiments, a client (e.g., 110A, 110B, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of DRAM and 1 CPU with 12 cores, whereas Client N (110N) may have 8 GB of PMEM and 1 CPU with 16 cores. Other different computational capabilities of the clients not listed above may also be taken into account without departing from the scope of the invention.

Figure 10:
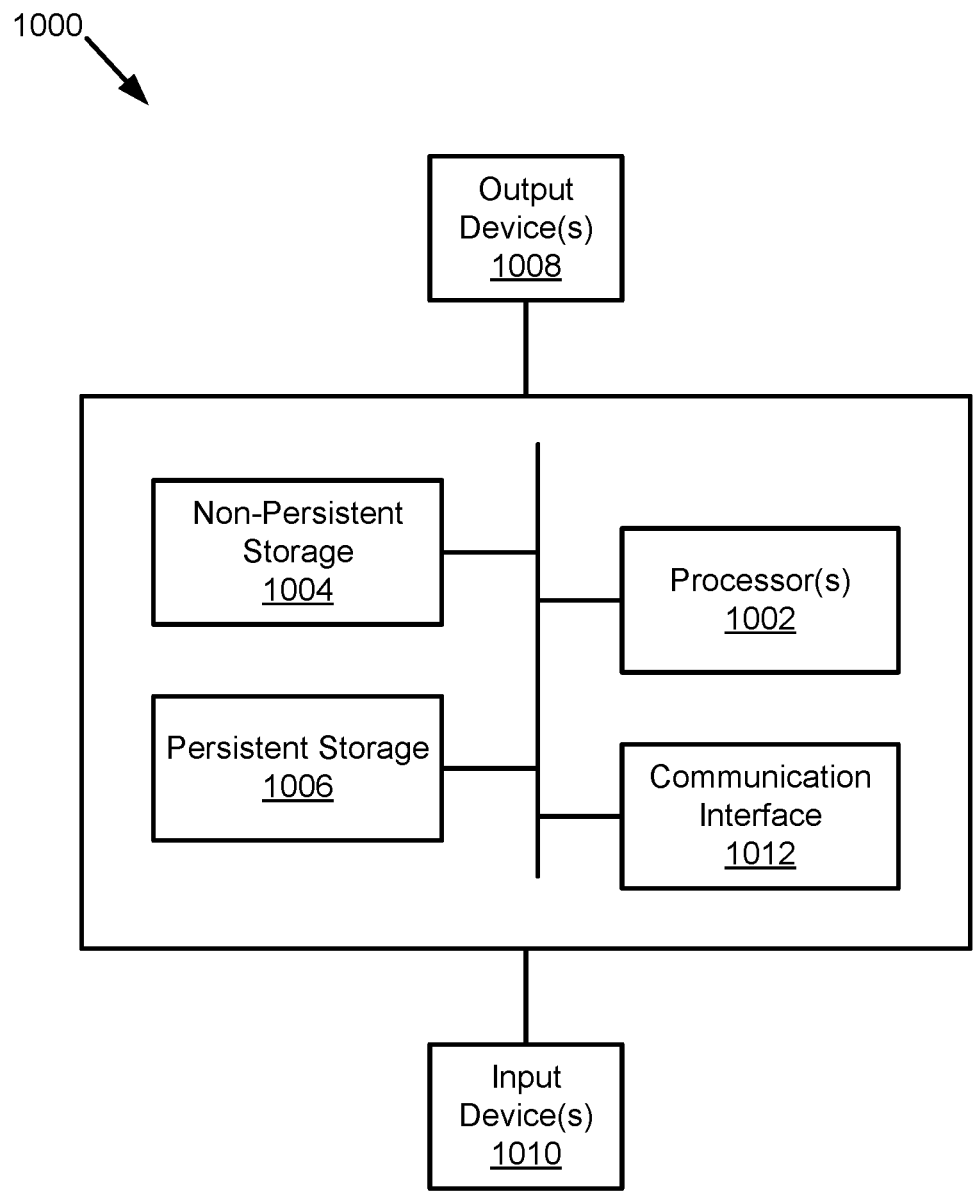
FIG. 10 shows a diagram of a computing device in accordance with one or more embodiments of the invention.

Further, in one or more embodiments, a client (e.g., 110A, 110B, etc.) may be implemented as a computing device (e.g., 1000, FIG. 10). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110B, etc.) may be implemented as a logical device (e.g., a VM). The logical device may utilize the computing resources of any number of computing devices to provide the functionality of the client described throughout this application.

In one or more embodiments, users may interact with (or operate) clients (e.g., 110A, 110B, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 1000, FIG. 10) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the infrastructure node (120) may include (i) a chassis configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the infrastructure node (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110B, etc.) and/or the databases (132) to generate additional data that is derived from the obtained data without experiencing any middleware and/or hardware limitations; (iii) provide meaningful information (e.g., one or more responses) back to the corresponding clients; (iv) filter data (e.g., received from a client) before pushing the data (and/or the derived data) to a storage device for management of the data and/or for storage of the data (while pushing the data, the infrastructure node may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing a linear, non-linear, and/or machine learning (ML) model to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another infrastructure node for review and/or other human interactions; (x) exchange data with other devices registered in/to the network (130) in order to, for example, participate in a collaborative workload placement (e.g., the infrastructure node (120) may split up a request (e.g., an operation, a task, an activity, etc.) with another infrastructure node, coordinating its efforts to complete the request more efficiently than if the infrastructure node (120) had been responsible for completing the request); (xi) provide software-defined data protection for clients (e.g., 110A, 110B, etc.); (xii) provide automated data discovery, protection, management, and recovery operations for clients; (xiii) monitor operational states of clients; (xiv) regularly back up configuration information of clients to the storage device; (xv) provide (e.g., via a broadcast, multicast, or unicast mechanism) information (e.g., a location identifier, the amount of available resources, etc.) associated with the infrastructure node (120) to other nodes in the system (100); (xvi) configure or control any mechanism that defines when, how, and what data to provide to the clients and/or storage device; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., the infrastructure node (120) may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the infrastructure node (120) may communicate with, for example, the storage device and/or the databases (132).

In one or more embodiments, monitoring the operational states of clients (e.g., 110A, 110B, etc.) may be used to determine whether it is likely that the monitoring of the scenes by the clients results in information regarding the scenes that accurately reflects the states of the scenes (e.g., a client (e.g., 110A, 110B, etc.) may provide inaccurate information regarding a monitored scene). Said another way, by providing monitoring services, the infrastructure node (120) may be able to determine whether a client is malfunctioning (e.g., the operational state of a client may change due to a damage to the client, malicious action (e.g., hacking, a physical attack, etc.) by third-parties, etc.). If the client is not in the predetermined operational state (e.g., if the client is malfunctioning), the infrastructure node (120) may take action to remediate the client. Remediating the client may result in the client being placed in the predetermined operational state which improves the likelihood that monitoring of the scene by the client results in the generation of accurate information regarding the scene.

As described above, the infrastructure node (120) may be capable of providing a range of functionalities/services to the users of clients (e.g., 110A, 110B, etc.). However, not all of the users may be allowed to receive all of the services. To manage the services provided to the users of the clients, a system (e.g., a service manager) in accordance with embodiments of the invention may manage the operation of a network (e.g., 130), in which the clients are operably connected to the infrastructure node. Specifically, the service manager (i) may identify services to be provided by the infrastructure node (for example, based on the number of users using the clients) and (ii) may limit communications of the clients to receive infrastructure node provided services.

For example, the priority (e.g., the user access level) of a user may be used to determine how to manage computing resources of the infrastructure node (e.g., 120A) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the infrastructure node (120) (e.g., while the computing resources of the infrastructure node may be capable of providing/performing any number of remote computer-implemented services, they may be limited in providing some of the services over the network (130)) and (ii) network traffic from that user is to be afforded a normal level of quality (e.g., a normal processing rate with a limited communication BW). By doing so, (i) computer-implemented services provided to the users of the clients (e.g., 110A, 110B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the infrastructure node (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single infrastructure node (e.g., 120) is considered above, the term "node" includes any collection of systems or sub-systems that individually or jointly execute a set, or multiple sets, of instructions to provide one or more computer-implemented services. For example, a single infrastructure node may provide a computer-implemented service on its own (i.e., independently) while multiple other nodes may provide a second computer-implemented service cooperatively (e.g., each of the multiple other nodes may provide similar and or different services that form the cooperatively provided service).

As described above, the infrastructure node (120) may provide any quantity and any type of computer-implemented services. To provide computer-implemented services, the infrastructure node may be a heterogeneous set, including a collection of physical components/resources (discussed above) configured to perform operations of the node and/or otherwise execute a collection of logical components/resources (discussed above) of the node.

In one or more embodiments, the infrastructure node (120) may implement a management model to manage the aforementioned computing resources in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the invention.

One of ordinary skill will appreciate that the infrastructure node (120) may perform other functionalities without departing from the scope of the invention. In one or more embodiments, the infrastructure node may be configured to perform all, or a portion, of the functionalities described in FIGS. 7 and 8.1-8.3.

In one or more embodiments, the infrastructure node (120) may be implemented as a computing device (e.g., 1000, FIG. 10). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the infrastructure node described throughout the application.

Alternatively, in one or more embodiments, similar to a client (e.g., 110A, 110B, etc.), the infrastructure node may also be implemented as a logical device.

In one or more embodiments, the infrastructure node (120) hosts a DV layer (122) and a QuAcc API service (123). Additional details of the DV layer and the QuAcc API service are described below in reference to FIG. 1.2. In the embodiments of the present disclosure, the DV layer (122) and the QuAcc API service (123) are demonstrated as part of the infrastructure node (120); however, embodiments herein are not limited as such. The DV layer and the QuAcc API service may be demonstrated as separate entities from the infrastructure node.

In one or more embodiments, all, or a portion, of the components of the system (100) may be operably connected each other and/or other entities via any combination of wired and/or wireless connections. For example, the aforementioned components may be operably connected, at least in part, via the network (130).

In one or more embodiments, the network (130) may represent a (decentralized or distributed) computing network and/or fabric configured for computing resource and/or messages exchange among registered computing devices (e.g., the clients, the infrastructure node, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the infrastructure node through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, a database of the databases (132) may provide long-term, durable, high read/write throughput data storage/protection with near-infinite scale and low-cost. A database may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, a database of the databases (132) may be implemented using physical devices that provide data storage services (e.g., storing data and providing copies of previously stored data). The devices that provide data storage services may include hardware devices and/or logical devices. For example, a database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, a database of the databases (132) may include a memory device (e.g., a dual in-line memory device), in which data is stored and from which copies of previously stored data are provided. As yet another example, a database of the databases (132) may include a persistent storage device (e.g., an SSD), in which data is stored and from which copies of previously stored data is provided. As yet another example, a database of the databases (132) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, a database of the databases (132) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, a database of the databases (132) may store/log/record unstructured and/or structured data that may include (or specify), for example (but not limited to): a valid (e.g., a granted) request and its corresponding details, an invalid (e.g., a rejected) request and its corresponding details, historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details, content of received/intercepted data packets/chunks, information regarding a sender (e.g., a malicious user, a high priority trusted user, a low priority trusted user, etc.) of data, information regarding the size of intercepted data packets, a mapping table that shows the mappings between an incoming request/call/network traffic and an outgoing request/call/network traffic, a cumulative history of user activity records obtained over a prolonged period of time, a cumulative history of network traffic logs obtained over a prolonged period of time, previously received malicious data access requests from an invalid user, a backup history documentation of a workload, a model name of a hardware component, a version of an application, a product identifier of an application, an index of an asset (e.g., a file, a folder, a segment, etc.), recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the infrastructure node (120), power consumption of components of the infrastructure node (120), etc. Based on the aforementioned data, for example, the infrastructure node (120) may perform user analytics to infer profiles of users communicating with components of the infrastructure node.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, a database of the databases (132) may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of the database may receive various data related inputs/queries directly (or indirectly) from Client A (110A). Upon receiving, the agent may analyze those inputs to generate an index(es) for optimizing the performance of the database by reducing a required amount of database access(es) when implementing a request (e.g., a data retrieval request). In this manner, requested data may be quickly located and accessed from the database using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, the infrastructure node (120). The infrastructure node may add, remove, and/or modify those data in a database of the databases (132) to cause the information included in the database to reflect the latest version of, for example, SLAs. The unstructured and/or structured data available in the database may be implemented using, for example, lists, tables, unstructured data, structured data, etc. While described as being stored locally, the unstructured and/or structured data may be stored remotely, and may be distributed across any number of devices without departing from the scope of the invention.

While a database of the databases (132) has been illustrated and described as including a limited number and type of data, the database may store additional, less, and/or different data without departing from the scope of the invention. In the embodiments described above, a database of the databases (132) is demonstrated as a remote entity; however, embodiments herein are not limited as such. In one or more embodiments, the database may be a local entity to clients (e.g., 110A, 110B, etc.) and the infrastructure node (120).

One of ordinary skill will appreciate that a database of the databases (132) may perform other functionalities without departing from the scope of the invention. The database may be implemented using hardware, software, or any combination thereof.

Turning now to FIG. 1.2. FIG. 1.2 shows components of the DV layer (122) and the QuAcc layer (124) in accordance with one or more embodiments of the invention. The DV layer (122) includes a collector (134), a query engine (136), and a query log module (138). The DV layer (122) may include additional, fewer, and/or different components without departing from the scope of the invention. Separately, the QuAcc layer (124) includes a cache engine (140), a lineage topology (142), a cache recommender (144), a list of "to be cached" items (146), a cache configuration interface (148), and cached items (150). Each component may be operably connected to any of the other component via any combination of wired and/or wireless connections. Each component illustrated in FIG. 1.2 is discussed below.

Referring to FIG. 1.2, a systematic integration of cache related components (i.e., the QuAcc layer (124)) is shown, in which the QuAcc layer (124) is located closely/parallel to the DV layer (122) (or other DV related layers hosted by the infrastructure node (e.g., 120, FIG. 1.1)), and executes as a separate service (i.e., as a QuAcc API service (123)) to (a) provide automatic cache recommendation and (b) manage cache configurations and cache refreshment policies. In one or more embodiments, as a service, the QuAcc API service (123) encompasses the components and functionalities of the QuAcc layer (124) as a service over the network (e.g., 130, FIG. 1.1) so that the QuAcc layer (124) may be used externally. For example, the cache recommender (144) may fetch query logs from the DV layer (122) (more specifically, from the query log module (138)) through a cache recommendation API (enabled by the QuAcc API service (123)), in which the cache recommendation API may be used to generate a recommended cache list/plan based on the query logs.

As yet another example, the query engine (136) may invoke a query acceleration API (enabled by the QuAcc API service (123)) to communicate with the cache engine (140) and to perform accelerated query related operations such as retrieving cached items, getting information about cached items, etc. As yet another example, an administrator may manage cache configurations (of "to be cached" data items) and cache refreshment policies (of "to be cached" data items) through a dynamic cache configuration API (enabled by the QuAcc API service (123)), in which the dynamic cache configuration API may be used to set or delete refreshment policies of "to be cached" data items or to obtain information about existing refreshment policies of cached data items. As yet another example, a lineage topology API (enabled by the QuAcc API service (123)) may be used to load lineage topology information into the QuAcc layer (124) (so that the information may be used by the cache recommender) and to implement a cache refreshment policy.

As used herein, a "cache" (or a caching mechanism) may be used to store data items resulting from one or more remote data sources (e.g., 132, FIG. 1.1) locally to accelerate execution of queries in the DV layer (122), in which the "cached" data items may include, for example (but not limited to): views, queries, query execution results, etc. Further, as used herein, a "cache refreshment policy" may represent a refreshment schedule of a cached data item, in which, for example, a cached view or a cached query execution result may need to be updated to prevent data staleness. In one or more embodiments, a cache refreshment policy may be a predetermined rule and each data item may need to be managed based on a different cache refreshment policy.

Separately, as used herein, a "lineage topology" (or a lineage map (142)) may refer to interconnections and associations among data sources, data views, and/or queries, indicating data process relationships and dependencies among them. A lineage topology may be illustrated as a directed acyclic graph (DAG) (see, e.g., FIGS. 2 and 3), in which (i) each node in the DAG may denote a data source, a view, or a query and (ii) an "edge" (of the DAG) may denote a lineage of the nodes.

In one or more embodiments, a "cache recommendation" workflow/process may be performed in cycles, in which a "cache" recommendation cycle may have an arbitrary duration (e.g., per day, per week, etc.). In each recommendation cycle, the cache recommender (144) may include functionality to, e.g.: (i) obtain (or collect) a query log (described below) from the query log module (138); (ii) analyze the query log (e.g., historical behavior of queries are analyzed to calculate a corresponding cache reward for each cacheable candidate, where based on their cache rewards, cacheable candidates are prioritized) and generate a smart and functional "cache" recommendation list of data items (e.g., views, query execution results, etc., are considered as cacheable data items) with high-level cache rewards (while providing the recommendation list, (a) the cache recommender may consider relationships among views and queries (which is indeed a lineage topology) and (b) to avoid any unwanted change in the recommendation list between consecutive recommendation cycles (e.g., in Cycle A, the list specifies M-O data items, whereas in Cycle B (which is the consecutive cycle), the list specifies X-Z), the cache recommender may consider cached data items from the previous recommendation cycle); (iii) receive an administrator-defined constraint (or upper bound) with respect to local storage volume available (in the cached items (150)) to cache/materialize data items (e.g., for cost-effective and space-effective storage of the data items); (iv) present the recommendation list (which includes, at least, "to be cached" data items in the current recommendation cycle) to the administrator via the cache configuration interface (148) (e.g., a GUI), in which the administrator may decide as appropriate (e.g., confirm the provided list, partially confirm the provided list, reject the provided list and redo the list manually based on his/her experience, etc.) and the recommendation list may then be updated accordingly; and/or (v) provide a list of confirmed "to be cached" data items to the cache engine (140).

One of ordinary skill will appreciate that the cache recommender (144) may perform other functionalities without departing from the scope of the invention. The cache recommender may be implemented using hardware, software, or any combination thereof.

In one or more embodiments, the "dynamic" cache configuration interface (148) may include functionality to, e.g.: (i) enable the administrator to confirm or manually modify cache related configurations (e.g., to be able to provide a better administrator experience); (ii) after displaying, enable the administrator to review/manage a recommendation list (which includes, at least, "to be cached" data items), in which the administrator may, for example, confirm the provided list, partially confirm the provided list or refine the list (e.g., promote or demote a specific data item in the list), reject the provided list and redo the list manually based on his/her experience, etc., through the interface; (iii) after displaying, enable the administrator to review/manage one or more refreshment policies of "to be cached" data items, in which the administrator may configure a schedule to update a specific data item based on its downstream usage (or its usage by a downstream application) through the interface (e.g., (a) for a data item, the administrator may set a corresponding refreshment schedule as its query frequency (($n_i$·freq), see FIG. 4), (b) a data item that will be cached with (undue) refreshment schedule may be highlighted/flagged so that the administrator may adjust the refreshment schedule accordingly, etc.); and/or (iv) provide one or more useful insights/alerts/suggestions on, for example, the historical behavior of queries and impacts of applied policies to the administrator to assist the administrator while identifying any improper refreshment policies and performing necessary changes (e.g., to help the administrator with respect to understanding the benefits and trade-offs of different options towards making a decision).

In one or more embodiments, after the recommendation list is provided to the administrator, the administrator may sort the recommended "to be cached" data items (included in the list) based on each data item's cache reward level. After sorting data items (or after sorting the list), the administrator may compare, for example, a first data item's priority level against a second data item's priority level and repeat this process until all data items' priority levels are compared (e.g., while comparing, the administrator may also consider a priority level of each downstream application that will employ a corresponding data item). Based on the comparison, for example, the administrator may confirm the recommendation list to initiate generation of an administrator-confirmed recommendation list (ACRL) and then, provide the ACRL to the cache engine (140).

In one or more embodiments, insights/alerts provided by the cache configuration interface (148) may include (or specify), for example (but not limited to): a data item is cached with an improper cache reward level, a data item is not cached but the item has a high-level cache reward (to this end, a suggestion may be provided to the administrator such as "please review/check the data item and add the item into the ACRL"), a data item is cached but the item has a low-level cache reward (to this end, a suggestion may be provided to the administrator such as "please check the data item and remove the item from the ACRL"), a data item is cached with an improper refreshment schedule, a data item is cached with an insufficient refreshment schedule (e.g., a downstream user/application employs the data item frequently (which may mean the data item is valuable and the data item should be materialized) but the schedule is set to a lower frequency) (to this end, a suggestion may be provided to the administrator such as "please change the refreshment policy of the data item to set the schedule to a higher frequency"), a data item is cached with undue refreshment schedule (e.g., a downstream user/application employs the data item infrequently but the schedule is set to a higher frequency) (to this end, a suggestion may be provided to the administrator such as "please change the refreshment policy of the data item to set the schedule to a lower frequency"), an improper view definition is detected that may cause data communication traffic overhead on a network (e.g., 130, FIG. 1.1) (to this end, a suggestion may be provided to the administrator such as "please remove or refine the view definition and ETL logic"), a usage frequency (or a usage trend) of specific data items is changed (e.g., even though, in each recommendation cycle, the absolute frequency value is considered by the cache recommender (144), observation of a long-term frequency usage may still provide business and/or triage insights such as "View A is used less frequently because one of View A's downstream applications is down") (to this end, a suggestion may be provided to the administrator such as "please verify/check if there is no change in the usage trend of the confirmed data items"), etc.

In one or more embodiments, the cache configuration interface (148) may feature a table that (i) one or more rows of the table indicate one of "to be cached" data items (of the corresponding recommendation list) and (ii) one or more columns of the table may indicate/described each data item's attributes (e.g., topological attributes, behavioral attributes, status variables, a linage path of a data item, a data source associated with the data item, downstream users/applications that employ the data item, etc.). Further, one or more rows of the table may indicate advanced insights such as, for example, a data item's historical usage frequency, a size of the data item (e.g., a size of data to be transferred from a remote data source), a cache reward level of a data item (calculated by the cache recommender (144)), etc. In one or more embodiments, the recommendation list may be sorted/adjusted (by the cache recommender (144)) in an ascending or descending order based on each of these columns so that information/insights provided by the table may assist the administrator to infer why a specific data item is recommended (by the cache recommender (144)) to cache (or is not recommended to cache).

One of ordinary skill will appreciate that the cache configuration interface (148) may perform other functionalities without departing from the scope of the invention. The cache configuration interface may be implemented using hardware, software, or any combination thereof.

In one or more embodiments, the cache engine (140) may include functionality to, e.g.: (i) communicate with the query engine (136) to respond one or more requests sent by the query engine (e.g., in response to receiving a data item related request from the query engine, the cache engine may send a response indicating that the data item has already been stored in a storage/memory device (e.g., 150) as a cached data item and ready to be presented to a requesting entity (e.g., a corresponding user)) and (ii) refresh a cached data item according to a predetermined refreshment policy (e.g., an administrator-defined refreshment policy (e.g., refresh per month, refresh per week, refresh on demand, etc.)), in which, unlike conventional approaches, the administrator may dynamically provide a list of recommended data items to cache and their refreshment policies through the cache configuration interface (148) rather than a static configuration.

One of ordinary skill will appreciate that the cache engine (140) may perform other functionalities without departing from the scope of the invention. The cache engine may be implemented using hardware, software, or any combination thereof.

In general, a cache policy defines what data to cache and what data to evict upon capacity misses through, for example, "cache admission" and "cache eviction" processes. Cache admission is a process that refers to the set of policies that dictate what data the cache stores and cache eviction is a process that determines what data to drop once the cache needs to free up space. Some of the conventional cache eviction policies include, for example (but not limited to): the least recently used (LRU) policy, the least frequently used (LFU) policy, the most recently used (MRU) policy, the random replacement (RR) policy, etc. For example, the LFU policy may perform better than the LRU policy in scenarios where "frequency of cached data access" is a better indicator of cache hits, indicating that an appropriate policy should be selected according to a pattern of cached data access.

In one or more embodiments, the cache recommender (144) may manage cache admission and cache eviction processes as one problem, that is, in each recommendation cycle (e.g., set by the administrator), the cache recommender (e.g., by employing a linear, non-linear, and/or ML model) may estimate each data item's cache reward and provide a list of recommended "to be cached" data items (where the data items may be sorted based on their rewards) to the administrator (via the cache configuration interface (148)). For example, once the administrator confirms the list, the cache engine (140) may store the data items specified in the list in the cached items (150) (e.g., a storage/memory resource or device (described above in reference to FIG. 1.1) managed by the cached items (150)) until the next recommendation cycle is initiated. In the meantime, if an existing data item (e.g., an already cached data item) does not appear in the list of the "current" recommendation cycle, the cache engine (140) may remove/evict that data item from the cached items (150).

In one or more embodiments, a recommendation list (e.g., the list of "to be cached" items (146)) may include different data items across consecutive recommendation cycles. To this end, some of the data items (that appear for the first time in the list or that are not available in the cached items (150)) may need to be retrieved/obtained from a remote data source (e.g., a database of the databases (e.g., 132, FIG. 1.1)). If the recommendation list changes significantly (e.g., due to changing attributes of data items), this may cause data communication traffic overhead on the network (e.g., inducing additional data input/output on the network, inducing traffic spike on the network, etc.). To prevent that (as described above), the cache recommender (144) may consider (i) relationships among data items and (ii) consider cached data items from the previous recommendation cycle.

In one or more embodiments, the cache recommender (144) may obtain one or more query logs from the query log module (138) to infer data access patterns of users/applications using the DV layer (122), in which the cache recommender may, for example, infer one or more accessed views by User A by parsing the logs including details of SQL queries (e.g., once the query "select XX from View A" is executed, View A is considered as accessed). Information that is obtained as a result of parsing the query logs may specify (or include), for example (but not limited to): a number of views that are accessed within a period of time (e.g., 5 views are accessed within the last 10-hour period, etc.), an access count/frequency of a specific view within a period of time, an identifier of a view that is accessed, a timestamp that shows when a view is accessed, an access count of a specific view that is accessed in an ad-hoc manner within a period of time, etc.

In one or more embodiments, different datasets (e.g., different views, different query results, etc.) may have different access behavior (where the DV layer (122) and the QuAcc layer (124) support data queries from both downstream applications and users), for example (but not limited to): different views may be accessed at different frequencies, a user may access data (by performing a query) through data exploration or analysis process (which is an ad-hoc process), a downstream application may access data (by performing a query) (where the access pattern of the application may be more consistent comparing to that of a user), etc. As indicated, considering users' "ad-hoc" data exploration behavior, some datasets may be accessed once or few times, where a frequency of accesses may be a better factor to consider.

However, the frequency of accesses should be calculated over a period of time, which makes the calculation is a complex process because the frequency of accesses may change quickly (or more and more data items may be accessed at different frequencies and cache capacity may not hold all the data item volume) and the calculation may need to be performed frequently. To overcome the aforementioned problems (e.g., to optimize query accesses with an increasing concurrency and to handle large volumes of data items effectively), an advanced cache policy is employed where the cache recommender (144) is executed for each recommendation cycle (at a relatively long duration (e.g., an hour, a day, etc.)). In each cycle, the cache recommender may collect query logs in batch and then calculate the frequency of accesses by aggregating the logs. With this way, for example, the cache recommender may recommend an optimal (or near optimal) set of data items (to cache).

Furthermore, in existing approaches (e.g., Dremio, Starburst, etc.), only views may be cached (or views are the only cacheable data items). In fact, the executed queries and their corresponding results may also be considered as views. For example, if a query is received from a downstream application, the query may be executed multiple times, where the application may use results of that query as an input to perform further analytics (e.g., the results of the query may be an intermediate view in an end-to-end data workflow). For this reason, the cache recommender (144) may consider query results as cacheable data items as well (in addition to views and queries).

In one or more embodiments, the query engine (136) may generate (or structure) a lineage topology (e.g., a map including historical information with respect to one or more data items) based on data (e.g., views) obtained from the collector (134) (which obtains one or more data items from a database periodically or on demand) and query logs obtained from the query log module (138) (which stores, at least, one or more query logs). Additional details of the lineage topology are described below in reference to FIG. 2.

One of ordinary skill will appreciate that the collector (134), the query engine (136), the query log module (138), and the cached items (150) may perform other functionalities without departing from the scope of the invention. The collector, the query engine, the query log module, and the cached items may be implemented using hardware, software, or any combination thereof.

In one or more embodiments, depending on the resource capabilities (or resource related parameters) of the infrastructure node (e.g., 120, FIG. 1.1) (which may be customized over time), components of the DV layer (122) and the QuAcc layer (124) may provide different functionalities (e.g., providing a better performance). For example, a resource related parameter may include (or specify), for example (but not limited to): a configurable CPU option (e.g., a valid/legitimate virtual CPU count per QuAcc layer component), a configurable network resource option (e.g., allowability of enabling/disabling single-root input/output virtualization (SR-IOV) for specific APIs), a configurable memory option (e.g., maximum and minimum allowable memory to cache data items), a configurable GPU option (e.g., allowable scheduling policy and/or virtual GPU count combinations), a configurable DPU option (e.g., legitimacy of disabling inter-integrated circuit (12C) for different QuAcc layer components), a user type, a network resource related template (e.g., a 10 GB/s BW with 20 ms latency QoS template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), an IOMMU configuration with respect to the cached items (150) (e.g., enabled, disabled, etc.), a wake on LAN support configuration (e.g., supported/enabled, not supported/disabled, etc.), a reserved memory configuration (e.g., as a percentage of configured memory such as 0-100%), a memory ballooning configuration (e.g., enabled, disabled, etc.), a vGPU count per QuAcc layer component (e.g., 1, 2, 4, 8, etc.), a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU, hypervisor-enabled drivers approach such as virtual shared graphics acceleration (vSGA), etc.), a user profile folder redirection configuration (e.g., a local user profile, a profile redirection, etc.), etc.

Figure 2:
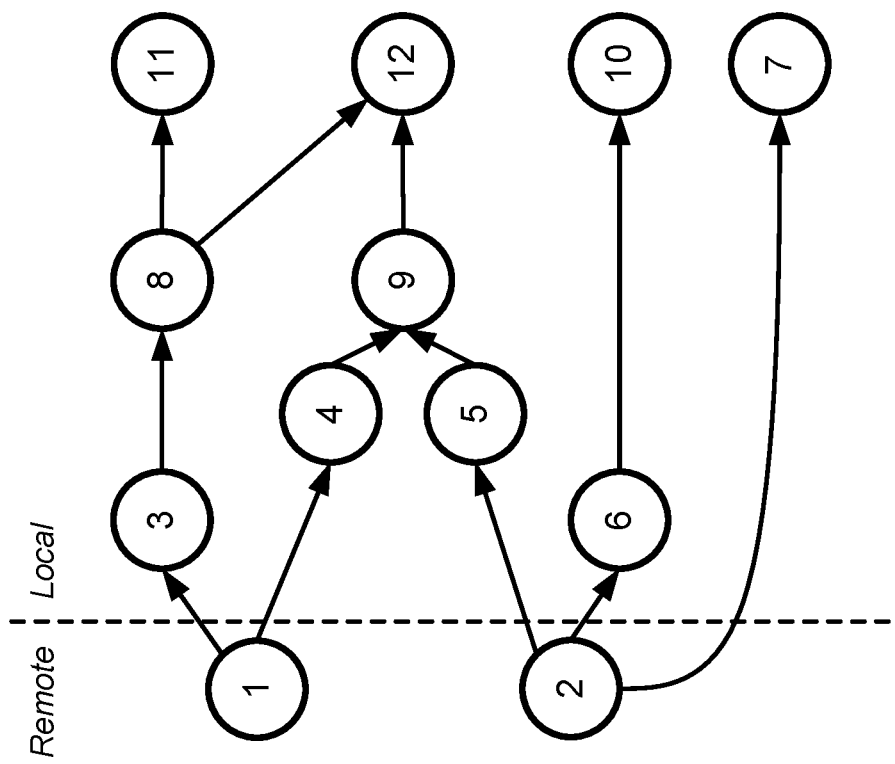
FIG. 2 shows a graph model for data items in a lineage topology in accordance with one or more embodiments of the invention.

Turning now to FIG. 2, FIG. 2 shows a graph model for data items in a lineage topology in accordance with one or more embodiments of the invention.

In one or more embodiments, a lineage topology may illustrate the history of a data item including the data item's interconnections and associations with other data items in the topology. Upon receiving the lineage topology from the query engine (e.g., 136, FIG. 1.2), the cache recommender (e.g., 144, FIG. 1.2) may convert the lineage topology into a DAG (or a graph model), in which (i) each data item in the DAG may denote a node, (ii) each node in the DAG may denote a data source table, a view, or a query, and (iii) each lineage relation between nodes may denote an edge from a source node to a target node.

In one or more embodiments, a graph model may be represented as "G=(N, E)", in which each node in the graph model may be assigned (by the cache recommender (e.g., 144, FIG. 1.2)) one or more attributes (e.g., topological attributes, behavioral attributes, etc.) and status variables that are used by the cache recommender afterwards. By obtaining the graph model (or simply the "graph"), the cache recommender may go back in time and infer the full history of each node from tracking, auditing, and/or replaying perspectives. In this manner, for example, the cache recommender may infer how the behavior of a node is changed over time. As yet another example, the cache recommender may identify activities/information (e.g., a type of a node, an identifier of a node, etc.) linked to the node and/or linked to a user/application who interacted with the node.

In one or more embodiments, topological attributes (e.g., the intrinsic information that are initialized/generated when constructing the graph or when lineage logic is defined) may specify (or include), for example (but not limited to): an identifier of a node (e.g., idx), a type of a node (e.g., Nodes 1-2 are "data source" nodes (which are "remote" to other "local" nodes in the graph), Nodes 3-6, 8, and 9 are "view" nodes, Nodes 7, 10-12 are "query" nodes (where a user/application may execute a query on a query node), etc.), the smallest depth of a node from a "source" node (e.g., a "level" of a node, where a source node's level is equal to zero (0)), one or more upstream nodes of a current node (e.g., formally, $N_i \cdot in = \{N_k | (k, i) \in E\}$, where E is the edges in G(N, E)), one or more downstream nodes of a current node (e.g., formally, $N_i \cdot out = \{N_k | (i, k) \in E\}$, where E is the edges in G(N, E)), a number (or "indegree") of $N_i \cdot in$ (e.g., a source node's indegree is equal to zero), a number (or "outdegree") of $N_i \cdot out$ (e.g., a query node's outdegree is equal to zero), etc.

In one or more embodiments, behavioral attributes (e.g., the statistics extracted from query logs) may specify (or include), for example (but not limited to): "time_cost" that is the time cost of executing a query statement of a node (given the node's upstream data is available), "freq" that is the "normalized" frequency of the invokes of a corresponding node, a size of data that is generated by a node, etc.

In one or more embodiments, status variables (e.g., dynamic variables that are used for reward estimation in a recommendation procedure) may specify (or include), for example (but not limited to): "remoteTran_size" that is the size of data to be transferred from a remote data source when a "non-cached" node is queried (where larger remoteTran_size indicates a higher priority of caching that node), "latency" that is the period of time that a user need to wait to get/obtain query results when the user has accessed to a corresponding node but that node is a non-cached node (where longer latency indicates a higher priority of caching the node), "reward" that is the advantage of caching a corresponding node (where the advantage may be, for example, reduced latency, faster network data transfer rates, etc.), "reward_last_cycle" that is the reward of a corresponding node in the last recommendation cycle (from the cache recommender's perspective, this attribute is needed to make sure the stability of generated recommendation list to avoid fluctuations between adjacent recommendation cycles), "cacheFlag" that is a flag that indicates whether or not a corresponding node is cached (e.g., cacheFlag=0 means "not cached" and cacheFlag=1 means "cached"), etc.

In one or more embodiments, the cache recommender (e.g., 144, FIG. 1.2) may calculate/analyze behavior attributes of a node based on historical query logs obtained from the query log module (e.g., 138, FIG. 1.2). In one or more embodiments, a query log may specify (or include), for example (but not limited to): an executed query, an execution timestamp of a query, an identifier (ID) of an invoked view, a name of an invoked view, one or more query execution time details (e.g., total execution time including metadata retrieval, planning, starting, executing, etc.), a status of an executed query (e.g., where the status may indicate (i) whether the query was successful and whether the query was completed within a targeted window (e.g., 100% of the query was completed) or (ii) whether the query was unsuccessful and how much of the query was not completed within the targeted window (e.g., 80% of the query was completed and 20% of the query was not completed), where the targeted window may be a period of time, with a definite start and end, within which a query is set to be completed), an amount of memory resource used to execute a query, an amount of processor resource used to execute a query, a type of an executed query, an identifier of a user who initiated execution of a query, etc. The query log may have different organizational structures without departing from the scope of the invention. For example, the query log may be implemented as a tree, a table, a linked list, etc.

Turning now to FIG. 3, FIG. 3 shows an example graph model (for data items in a lineage topology) and attributes of a specific node (that represents a view) in accordance with one or more embodiments of the invention. In one or more embodiments, the example graph model includes (i) Nodes 1-2 as data sources, (ii) Node 3 as a view node, and (iii) Nodes 4-6 as query nodes. Referring to FIG. 3, attributes of Node 3 may specify (or include), for example (but not limited to): Node.idx=3 (or simply N.idx=3), N.type="view", N·level=1, N·in=[1, 2], N·out=[4, 5, 6], N·indegree=2, N·outdegree=3, N·time_cost=100 ms (which is calculated by aggregating query logs (more specifically, by aggregating the related execution time)), N·freq=10 Hertz (where, for example, (a) N·freq of a "query" node may be calculated by analyzing the number of associated records appearing within a defined period of time and (b) N·freq of a "view" node may be calculated by employing a backward frequency propagation), N·size=100 kilobytes (kB), N·remoteTran_size, N·latency, N·reward, N·reward_last_cycle, N·cacheFlag, etc.

Turning now to FIG. 4, FIG. 4 shows an example recommendation procedure/process performed by the cache recommender (e.g., 144, FIG. 1.2) in accordance with one or more embodiments of the invention. Referring to FIG. 4, the "input" parameter of the process is defined as (i) "a lineage topology", (ii) "a query log", and (iii) "the current recommendation cycle t". Separately, the "output" parameter of the process is defined as "a list of recommended "to be cached" data items rcmd(t)".

As indicated, the cache recommender (e.g., 144, FIG. 1.2) performs the process in twenty steps, in which (i) Steps 1-11 describe a way to construct a graph (from the obtained lineage topology) and to assign one or more topological and behavioral attributes (where the topological attributes are obtained by parsing the linage topology and the behavioral attributes are obtained from the query log) to each node (e.g., Steps 7-11 describe how to assign a query frequency to each "query" node and then backward propagate a query frequency from a "query" node to a "view" node, where each downstream node will propagate its frequency to its "N·in" node along the graph (see FIG. 5)), (ii) Steps 12-20 describe how to initialize each node's status so that each status would be used while estimating a reward of caching each node (e.g., Step 12 describes how to initialize a first recommendation cycle, Step 13 describes how to exclude a data source node from a recommendation list because a data source node cannot be cached, Steps 16-18 describe how to initiate the status of first level nodes (which are the direct downstream nodes of a remote data source node), Step 17 describes that a first level node's "remoteTran_size" as its node size, Step 18 describes a first level node's "latency" as the sum of a remote data source node's response time and the first level node's execution time, etc.), (iii) Step 19 describes a subset process to estimate/update a reward of each cacheable data item (see FIGS. 6.1 and 6.2), and (iv) as a result of Step 19, Step 20 describes how to return a list of recommended "to be cached" data items (e.g., a recommendation list). At the same time, the status of each node is updated in the graph "G(N, E)", specifically, the node status variables (e.g., cacheFlag, reward_last_cycle, etc.) so that the latest version of those variables would be stored in a storage/memory resource (e.g., 150, FIG. 1.2) and be ready for the next recommendation cycle (t+1) procedure.

Turning now to FIG. 5, FIG. 5 shows an illustration of a frequency backward propagation performed by the cache recommender (e.g., 144, FIG. 1.2) in accordance with one or more embodiments of the invention. Referring to the graph shown in FIG. 2, the cache recommender may perform the frequency backward propagation by, e.g.: (i) determining an upstream node of each node included in the graph (e.g., Node 8 is an upstream node of Nodes 11-12) and (ii) based on the determining, propagating each downstream node's frequency to its upstream node along the graph.

For example, as a result of the frequency backward propagation, (i) Node 8's execution frequency becomes 30 (10(Node 11's query frequency)+20 (Node 12's query frequency)=30), (ii) Node 9's execution frequency becomes 20 (because Node 12's query frequency is 20), (iii) Node 4's execution frequency becomes 20 (because Node 9's query frequency is 20), (iv) Node 5's execution frequency becomes 20 (because Node 9's query frequency is 20), (v) Node 6's execution frequency becomes 5 (because Node 10's query frequency is 5), (vi) Node 3's execution frequency becomes 30 (because Node 8's query frequency is 30), (vii) Node 2's execution frequency becomes 55 (20 (Node 5's execution frequency)+5 (Node 6's execution frequency)+30 (Node 7's query frequency)=55), and (viii) Node 1's execution frequency becomes 50 (20(Node 4's execution frequency)+30 (Node 3's execution frequency) =50).

Turning now to FIG. 6.1, FIG. 6.1 shows an example procedure (performed by the cache recommender (e.g., 144, FIG. 1.2)) to update the reward of each cacheable data item in accordance with one or more embodiments of the invention. Comparing to FIG. 6.2, FIG. 6.1 shows a simpler procedure (e.g., update_cache_reward (G(N,E), t)) to update a cache reward of a cacheable data item, in which the simpler procedure may only consider a frequency of each node as a criteria to determine cache reward of that node.

Referring to FIG. 6.1, the "input" parameter of the procedure is defined as (i) "G(N, E) with a stored status" and (ii) "the current recommendation cyclet". Separately, the "output" parameter of the process is defined as (i) "the updated status of G(N, E) at cycle t" and (ii) the list of recommended "to be cached" data items rcmd(t)".

As indicated, the cache recommender (e.g., 144, FIG. 1.2) performs the process in five steps, in which, for example, Step 1 describes how to exclude data source nodes form the process. In one or more embodiments, as an alternative to Step 4, the cache recommender may implement "Select nodes from N where $n_k$·reward>threshold, where $n_k$·cacheFlag=1" as Step 4, in which the "threshold" is a predetermined parameter (set by the administrator manually or set by the cache recommender automatically) to select a corresponding node with a suitable reward (e.g., the "threshold" filters out the nodes that do not provide a suitable/required reward). In one or more embodiments, the simpler procedure illustrated in FIG. 6.1 may be valid for a simple lineage topology with depth/level≤3 (e.g., a depth from a remote data source node to a corresponding node). For example, there are four levels (e.g., Level 0-Level 3) in the graph illustrated in FIG. 9.5, so the depth is equal to four.

If there are multiple data items (e.g., views) located along the way from a remote data source node to a corresponding query node, the embodiment presented in FIG. 6.1 may tend to cache all cacheable and most frequently used data items along the way. For this reason, in some DV cases, the cache recommender (e.g., 144, FIG. 1.2) may need to consider not only frequency (as a factor), but also query latency and network data transfer cost based on the node dependencies in a given graph model (or based on the data item dependencies in a given lineage topology). For this reason, depending on the DV case, the cache recommender may implement an advanced cache reward update process.

Turning now to FIG. 6.2, FIG. 6.2 shows an example procedure (performed by the cache recommender (e.g., 144, FIG. 1.2)) to update the reward of each cacheable data item in accordance with one or more embodiments of the invention. Comparing to FIG. 6.1, FIG. 6.2 shows an advanced procedure (e.g., update_cache_reward (G(N, E),t)) to update a cache reward of a cacheable data item.

Referring to FIG. 6.2, the "input" parameter of the procedure is defined as (i) "G(N, E) with a stored status" and (ii) "the current recommendation cycle t". Separately, the "output" parameter of the process is defined as (i) "the updated status of G(N, E) at cycle t" and (ii) the list of recommended "to be cached" data items rcmd(t)".

As indicated, the cache recommender (e.g., 144, FIG. 1.2) performs the process in twenty-three steps, in which (i) Steps 1-9 describe how the cache recommender travels along the graph by using the "level order traversal" method (or the breadth first search (BFS) method) (e.g., by using the BFS method, the cache recommender may travel through a level of nodes at each loop iteration to ensure that a reward of each related node is estimated/calculated only if that node's upstream nodes' "cacheFlags" have already been determined so that the "remoteTran_size" and "latency" factors may be considered and propagated accordingly), (ii) Step 4 indicates (a) if a corresponding node is not cached, the user may experience latency when querying the node and (b) if an upstream node of a corresponding node is cached, the user may not experience any latency when querying the corresponding node because the cost of accessing the corresponding node (or the corresponding data item) is deemed negligible, (iii) Step 5 describes a size of data that needs to be transferred from a remote data source node if a "non-cached" node is queried (by a user or an application), (iv) Step 6 describes that a reward of caching a node is a combination of both latency cost and network data transfer size (or network data transfer cost) associated with the node (where "$B_{time}$" and "$B_{tf}$" are normalized functions to eliminate the difference in magnitude, for example, (a) if $B_{time}$ (·)=0, this means only the network data transfer cost is considered and (b) if $B_{tf}$ (·)=0, this means only the latency cost is considered), (v) Step 9 indicates if a node is set as "to be cached" node, then the node's size needs to be added into the total local storage cost, (vi) Steps 10-22 describe an optional subprocedure that tunes a recommendation list (or a cache list) if the total local storage cost (or the total capacity cost) is exceeded or the local storage (e.g., 150, FIG. 1.2) still has space to accept more data items to cache (e.g., during this subprocedure, the cache recommender may remove a data item with the smallest reward if the total capacity cost is exceeded, or otherwise, may add a data item with the largest reward into the recommendation list from a waiting list (indicated in Step 18))

For example, consider a "latency propagation" scenario (with respect to (ii) (b) above) where Node 4 and Node 5 are upstream nodes of Node 9. In this scenario, assume that (i) Node 4's latency=30, (ii) Node 5's latency=40, and (iii) Node 9's time_cost=10. To this end, Node 9's latency will be 50 (max (30, 40)+10=50) and that will increase Node 9's reward (because of Node 9's high latency). If Node 5 has already been cached, Node 5's latency will be zero and, accordingly, Node 9's latency will be 40 (max (30, 0)+10=40). Separately, if both Node 4 and Node 5 have already been cached, Node 4's latency and Node 5's latency will be zero and, accordingly, Node 9's latency will be 10 (max (0, 0)+10=10).

As yet another example, consider a "node.remoteTran_size" scenario (with respect to (iii) above) where a corresponding graph includes two adjacent nodes, Node A and Node B. In this scenario, if Node A has not been cached, then querying Node B (just for 1 kB data item) will cost 1 megabyte (MB) data transfer overhead (from a remote data source node) over the network because of Node B's dependency on Node A (where, first, 1 MB data needs to be transferred and then, the queried 1 kB data will be obtained from the 1 MB data).

Separately, in this scenario, if Node A has already been cached, then querying Node B will not cost any data transfer overhead on the network because the queried 1 kB data will be directly obtained from the cached 1 MB data of Node A (e.g., without a need for transferring data associated with Node A first). As indicated in the aforementioned scenario, "node.remoteTran_size" may need to be calculate because node.remoteTran_size may not always equal to "node.size". However, if Node A is only consumed by Node B, then Node A may be removed and Node B may be directly linked to the remote data source node so that the data transfer cost/overhead over the network may be reduced from 1 MB to 1 kB.

In an actual implementation (with respect to Steps 1-9), the cache recommender (e.g., 144, FIG. 1.2) may use an optimized data structure to reduce complexity of the advanced procedure (e.g., O (N×max(node level))→O(N)) by, for example: (i) generating an empty "first in, first out" (FIFO) queue and enqueuing the "root" nodes (e.g., the nodes with $n_i$·level==1), (ii) while the queue is not empty, performing (a) dequeuing a corresponding node from the queue and analyzing that node (to infer computer relevant metrics) and (b) enqueuing all the child nodes of the dequeued node (if any), and/or (iii) repeating (ii) until the queue becomes empty.

Further, in an actual implementation (with respect to Step 6), the cache recommender (e.g., 144, FIG. 1.2) may translate latency and network data transfer costs into a monetary charge. For example, consider a scenario where a cloud vendor provides a serverless compute service that allows a user to execute an application virtually. In this scenario, a monetary charge associated with this service may be used to define "$B_{time}$ (·)" as (i) $0.00015 for every gigabyte (GB) per second (related to duration) and (ii) $0.20 per one million requests. Separately, in this scenario, a monetary charge associated with this service may be used to define "$B_{tf}$ (·)" as (i) $0.09 per-GB for the first 10 terabyte (TB) and (ii) $0.07 for the next 40 TB per-month.

In one or more embodiments, as an alternative to Step 6 of the advanced procedure, the cache recommender (e.g., 144, FIG. 1.2) may implement "$n_i$·reward =

$B_{time}(n_i \cdot freq \times n_i \cdot \text{latency}) + B_{tf}(n_i \cdot freq \times n_i \cdot \text{remoteTran\_size})$"

$$d \text{ "} n_i \cdot \text{reward} = \frac{n_i \cdot \text{reward}}{n_i \cdot \text{size}} \text{"}.$$

As indicated, the alternative Step 6 considers the node size as a cost factor, in which the reward is defined as the ratio of the original size to the "size" cost. In most cases, the cache recommender may implement the alternative Step 6 due to the infrastructure node's (e.g., 120, FIG. 1.1) capacity limitations (if any) to cache data items and to enable lower operational costs. For example, by considering the node size in reward estimations, a node that will cause high latency and large remote data transfer overhead may not always be selected as "to be cached" node.

Further, to avoid major variations between consecutive cycles while implementing the advanced procedure, the cache recommender may use the following alternative Step 6 (to update the variable "$n_i$·reward_last_cycle"):

"$n_i$·reward =

$B_{time}(n_i \cdot freq \times n_i \cdot \text{latency}) + B_{tf}(n_i \cdot freq \times n_i \cdot \text{remoteTran\_size})$";

"$n_i \cdot \text{reward} = \frac{n_i \cdot \text{reward}}{n_i \cdot \text{size}}$";

"$n_i$·reward = $\alpha \times n_i$·reward + $(1 - \alpha) \times n_i$·reward_last_cycle";

"$n_i \cdot \text{reward}_{last_{cycle}} = n \cdot \text{reward}$".

and

As indicated, in order to determine which data items should be cached in the current recommendation cycle, the cache recommender considers a reward of each cacheable data items in the last recommendation cycle. Otherwise, if the recommended data items from the two consecutive recommendation cycles are quite different, the cache engine (e.g., 140, FIG. 1.2) may experience additional and unnecessary data read/write overhead.

As indicated above, the alternative Step 6 adds an estimated reward of a data item (in the last recommendation cycle) to a current reward of the data item with a weight ($\alpha$), where the smaller "$\alpha$" may cause more focus on the estimated reward to provide a more stable recommendation list. In one or more embodiments, the impact of the estimated reward may decay over time. For example, assuming that $\alpha=2$ in the "t+1" recommendation cycle, the impact will be 0.8. Then, in the "t+2" recommendation cycle, the impact will be 0.64.

Figure 7:
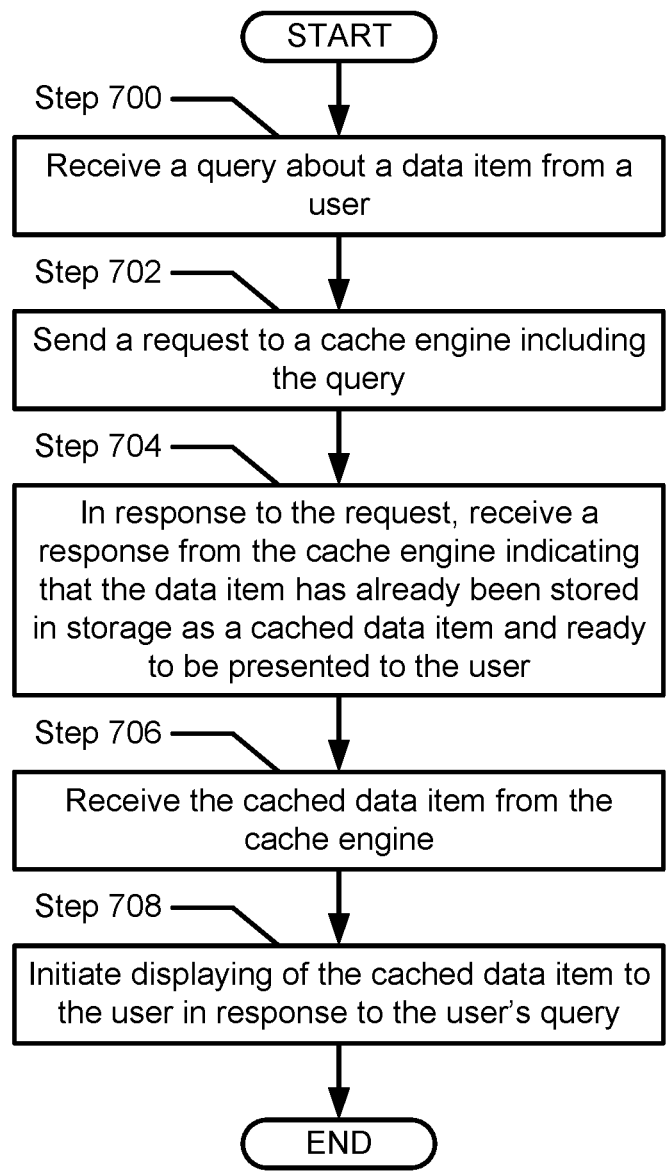
FIG. 7 shows a method for managing a user query in accordance with one or more embodiments of the invention.

FIG. 7 shows a method for managing a user query in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 7, the method shown in FIG. 7 may be executed by, for example, the above-discussed query engine (e.g., 136, FIG. 1.2), cache engine (e.g., 140, FIG. 1.2), and cached items (e.g., 150, FIG. 1.2). Other components of the system (100) illustrated in FIG. 1.1 may also execute all or part of the method shown in FIG. 7 without departing from the scope of the invention.

In Step 700, the query engine receives a query about a data item (e.g., for data discovery purposes) from a requesting entity (e.g., a user/customer of Client A (e.g., 110A, FIG. 1.1), an administrator terminal, an application, etc.), in which the query may include/specify information with respect to the data item (e.g., an identifier of the data item, an identifier of the user who initiated the query, an identifier of a client used by the user, etc.). In response to receiving the query, as part of that query, and/or in any other manner (e.g., before initiating any computation with respect to the query), the query engine invokes the query acceleration API (enabled by the QuAcc API service (e.g., 123, FIG. 1.2)) to communicate with the cache engine (in order to perform accelerated query related operations such as retrieving cached data items, getting information about cached data items, etc.).

In Step 702, with the help of the query acceleration API, the query engine sends a request to the cache engine, in which the request may include the query initiated by the user. In Step 704, upon receiving the request (including the information provided with the query in Step 700), the cache engine analyzes the request. Based on the provided information, the cache engine (i) may locate and access the queried data item in the cached items (e.g., the storage/memory resource of the QuAcc layer) or (ii) may not locate and access the queried data item in the cached items.

In the case of (ii) and in response to receiving the request, as part of that request, and/or in any other manner, the cache engine may send a response to the query engine indicating that the data item (e.g., a view) has not been stored in the cached items. Upon receiving this response, the query engine may communicate with the collector (e.g., 134, FIG. 1.2) and send a data retrieval request (including the information associated with the queried data item) to the collector. Upon receiving the data retrieval request, the collector may retrieve the data item from a remote database of the databases (e.g., 132, FIG. 1.1) and provide the data item to the query engine. Thereafter, the query engine may initiate displaying of the "retrieved" data item to the user in response to the user's query (received in Step 700). In one or more embodiments, the data item may be displayed on a GUI of the corresponding client (e.g., Client A).

In the case of (i) and in response to receiving the request, as part of that request, and/or in any other manner, the cache engine may send a response to the query engine indicating that the data item has already been stored/cached in the cached items and ready to be presented to the user.

In Step 706, upon receiving the response, the query engine sends a data retrieval request to the cache engine. Based on the data retrieval request, the cache engine may locate and retrieve the "cached" data item from the cached items and provide the data item to the query engine. Said another way, the query engine may receive the cached data item (which is queried in Step 700) from the cache engine.

In Step 708, upon receiving the cached data item, the query engine initiates displaying of the cached data item to the user in response to the user's query (received in Step 700). In one or more embodiments, the data item may be displayed on a GUI of the corresponding client (e.g., Client A). In one or more embodiments, the method may end following Step 708.

FIG. 8.1 shows a method to provide a recommendation list in a recommendation cycle (e.g., a first recommendation cycle) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 8.1, the method shown in FIG. 8.1 may be executed by, for example, the above-discussed cache recommender (e.g., 144, FIG. 1.2), query log module (e.g., 138, FIG. 1.2), cache configuration interface (e.g., 148, FIG. 1.2), and cache engine. Other components of the system (100) illustrated in FIG. 1.1 may also execute all or part of the method shown in FIG. 8.1 without departing from the scope of the invention.

In Step 800, the cache recommender obtains (or fetches) a query log from the query log module (using the cache recommendation API (enabled by the QuAcc API service)) at a first point-in-time to perform the first recommendation cycle. In one or more embodiments, the query log may specify (or include), for example, the query initiated/performed by the user in Step 700 of FIG. 7. Details of the query log are described above in reference to FIG. 2.

In Step 802, upon obtaining the query log and to initiate performance of the first recommendation cycle from a query log module, the cache recommender analyzes (by employing a set of linear, non-linear, and/or ML models) to perform a first recommendation cycle (RC) the query log to generate a recommendation list including at least a data item with a high-level cache reward. Additional details of the analysis are described below in reference to FIG. 8.3. In one or more embodiments, the recommendation list may specify one or more data items (e.g., a first "cacheable" data item, a second "cacheable" data item, etc.) that needs to be cached in the cached items.

Further, while generating the recommendation list and to prevent data communication traffic overhead with a remote data source (e.g., a database of the databases), the cache recommender may generate the recommendation list by considering previously cached data items related to another recommendation cycle before the first recommendation cycle.

In Step 804, using the dynamic cache configuration API (enabled by the QuAcc API service), the cache recommender provides the recommendation list to an administrator via the cache configuration interface. In one or more embodiments, upon receiving the recommendation list, the administrator may manage, at least, a cache configuration associated with "to be cached" data items specified in the recommendation list and their cache refreshment policies. For example, consider a scenario where the administrator may sort a first cacheable data item and a second cacheable data item included in the recommendation list based on the first data item's cache reward level and the second data item's cache reward level. After sorting the data items of the recommendation list, the administrator may compare the first data item's priority level against the second data item's priority level and based on the comparison, the administrator may confirm (e.g., based on his/her experience) the recommendation list to initiate generation of an ACRL.

In this scenario, the comparison may indicate that a larger size of data needs to be transferred from a remote data source (e.g., a database of the databases) for the first data item, which makes the first data item a high-priority data item for caching.

In Step 806, referring to the aforementioned scenario in Step 804, the cache recommender receives the ACRL from the administrator (via the cache configuration interface) in response to the recommendation list being provided to the administrator in Step 804.

In Step 808, upon receiving the ACRL, the cache recommender provides the ACRL to the cache engine. Referring to the aforementioned scenario in Step 804 and after receiving a confirmation from the administrator with respect to the recommendation list, the cache engine may store/cache the first data item in the cached items as a "cached" data item until a second recommendation cycle is initiated (e.g., at a second point-in-time). Further, if the ACRL does not specify a previously cached data item, the cache engine may remove the previously cached data item from the cached items. In one or more embodiments, the method may end following Step 808.

FIG. 8.2 shows a method to manage a data item in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 8.2, the method shown in FIG. 8.2 may be executed by, for example, the above-discussed cache engine, cache recommender, cache configuration interface, and query engine. Other components of the system (100) illustrated in FIG. 1.1 may also execute all or part of the method shown in FIG. 8.2 without departing from the scope of the invention.

In Step 810, at a first point-in-time while a first recommendation cycle is being performed, the cache engine receives an ACRL (e.g., the ACRL generated in Step 804 of FIG. 8.2) from the cache recommender. In Step 812, the cache engine receives a refreshment policy associated with a data item (e.g., referring to Step 808 of FIG. 8.2, the first data item) included in the ACRL from the administrator via the cache configuration interface.

In Step 814, based on the ACRL (received in Step 812), the cache engine stores the data item in the cached items as a "cached" data item until a second recommendation cycle is initiated. In Step 816, at a second point-in-time (after the first point-in-time), the cache engine refreshes the cached data item based on the refreshment policy. In Step 818, the cache engine receives a request from the query engine (via the query acceleration API) specifying a query of the data item, in which the query engine has received the query from a user. Upon receiving the request (including the query and information provided with the query), the cache engine may analyze the request and locate the queried data item in the cached items.

In Step 820, after analyzing the request and in response to receiving the request, as part of that request, and/or in any other manner, the cache engine sends a response to the query engine indicating that the "queried" data item has already been stored/cached in the cached items (as the cached data item) and ready to be presented to the user.

Upon receiving the response, the query engine may send a data retrieval request to the cache engine. Based on the data retrieval request, the cache engine may locate and retrieve the cached data item from the cached items and provide the data item to the query engine. Thereafter, upon receiving the cached data item, the query engine may initiate displaying of the cached data item to the user in response to the user's query. In one or more embodiments, the data item may be displayed on a GUI of the corresponding client. In one or more embodiments, the method may end following Step 820.

FIG. 8.3 shows a method to generate the recommendation list in the recommendation cycle (refer to Step 802 of FIG. 8.1) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 8.3, the method shown in FIG. 8.3 may be executed by, for example, the above-discussed cache recommender, query engine, cache engine, and cached items. Other components of the system (100) illustrated in FIG. 1.1 may also execute all or part of the method shown in FIG. 8.3 without departing from the scope of the invention.

In Step 822, using the query acceleration API, the cache recommender obtains (or fetches) a lineage topology from the query engine, in which (i) the lineage topology may specify historical data activities linked to a data item and (ii) query engine may generate the lineage topology based on historical query logs (including the query log discussed in Step 800 of FIG. 8.1) stored in the query log module. For example, after parsing the historical query logs, the query engine may infer/obtain an access pattern of View A and View B over a period of time, in which the access pattern may specify that View A is accessed by the user at a first frequency and View B is accessed by the user at a second frequency.

In Step 824, upon obtaining the lineage topology and by employing a set of linear, non-linear, and/or ML models, the cache recommender analyzes the lineage topology to infer one or more data items included in the lineage topology. In Step 826, based on the analysis performed in Step 824, the cache recommender generates a graph model for the data items (see, e.g., FIG. 2). More specifically, the cache recommender converts the lineage topology into the graph model (where the data items are illustrated as nodes (e.g., data source nodes, view nodes, query nodes, etc.)).

In Step 828, the cache recommender assigns topological attributes, behavioral attributes, and status variables to each data item in the graph model. Details of the topological attributes, behavioral attributes, and status variables are described above in reference to FIG. 2. In Step 830. (i) based on the topological attributes, behavioral attributes, and status variables of each data item, and (ii) by employing a set of linear, non-linear, and/or ML models/procedures (see FIGS. 4, 5, 6.1, and 6.2), the cache recommender generates the recommendation list.

In Step 832, with the help of the cache engine, the cache recommender stores the recommendation list in the caches items in order to use the recommendation list in a second recommendation cycle (when initiated) after the recommendation cycle. In one or more embodiments, the method may end following Step 832.

As discussed above, one or more embodiments provides an advanced and holistic framework (e.g., the QuAcc layer (e.g., 124, FIG. 1.2)) and presents all the functionalities of the framework as a service in order to make the framework compatible with current/conventional DV implementations; however, embodiments herein are not limited as such. In another embodiment, (i) the cache recommender (e.g., 144, FIG. 1.2) may be replaced with a conventional recommender (e.g., a "frequency first" recommender, a "recency first" recommender, etc.) of the invention and (ii) a lineage topology input may not be provided to the conventional recommender. To this end, this embodiment shows that the presented QuAcc layer may also operate with existing ecosystem components, where the conventional recommender may (i) utilize query logs to determine data items to cache and (ii) may employ, for example, LRU cache model or LFU cache model.

Further, in another embodiment, the holistic framework may still be implemented, but without providing a recommendation list to an administrator via the cache configuration interface (e.g., 148, FIG. 1.2). Rather, the "decision making" process with respect to caching data items may be performed automatically by another cache selection mechanism/framework.

To further clarify embodiments of the invention, a non-limiting example use case is provided in FIGS. 9.1-9.14.

Start of Example

The example use case, illustrated in FIGS. 9.1-9.14, is not intended to limit the scope of the embodiments disclosed herein and is independent from any other examples discussed in this application. FIGS. 9.1-9.14 illustrate an example cache recommendation procedure.

Turning now to FIG. 9.1, FIG. 9.1 shows "building a graph model" step of the example cache recommendation procedure. For the sake of brevity, not all components of a graph model (or a "graph") may be discussed in FIG. 9.1.

Assume here that the cache recommender converts a lineage topology into a graph, in which the graph includes: (i) Nodes 1-2 as "data source" nodes (which are "remote" to other "local" nodes in the graph and cannot be cached), (ii) Nodes 3-6, 8, and 9 as "view" nodes, and (iii) Nodes 7, 10-12 as "query" nodes.

Turning now to FIGS. 9.2-9.4, FIGS. 9.2-9.4 show "updating the statistics/features of the nodes in a given recommendation cycle" step of the example cache recommendation procedure. For the sake of brevity, not all details of the updating step may be discussed in FIGS. 9.2-9.4.

In FIG. 9.2, the cache recommender assigns "size" and "time_cost" features/attributes to each node based on a query log obtained from the query log module. Assume here that: (i) Node 3's attributes: (a) frequency=not applicable (N/A), (b) size=100 KB, and (c) time_cost=10 ms; (ii) Node 4's attributes: (a) frequency=N/A, (b) size=5 kB, and (c) time_cost=8 ms; (iii) Node 5's attributes: (a) frequency=N/A, (b) size=1 kB, and (c) time_cost=2 ms; (iv) Node 6's attributes: (a) frequency=N/A, (b) size=1 MB, and (c) time_cost=1 ms; (v) Node 7's attributes: (a) frequency=N/A, (b) size=0.1 kB, and (c) time_cost=0.5 ms; (vi) Node 8's attributes: (a) frequency=N/A, (b) size=50 KB, and (c) time_cost=2 ms; (vii) Node 9's attributes: (a) frequency=N/A, (b) size=50 KB, and (c) time_cost=3 ms; (viii) Node 10's attributes: (a) frequency=N/A, (b) size=1 MB, and (c) time_cost=3 ms; (ix) Node 11's attributes: (a) frequency=N/A, (b) size=1 kB, and (c) time_cost=1 ms; and (x) Node 12's attributes: (a) frequency=N/A. (b) size=2 kB, and (c) time_cost=2 ms.

In FIG. 9.3, the cache recommender assigns "query frequency" attribute to the query nodes (e.g., Nodes 7, 10-12) based on the query log. After the assignment: (i) Node 7's attributes: (a) frequency=30 Hz (indicated as underlined), (b) size=0.1 kB, and (c) time_cost=0.5 ms; (ii) Node 10's attributes: (a) frequency=5 Hz (indicated as underlined), (b) size=1 MB, and (c) time_cost=3 ms; (iii) Node 11's attributes: (a) frequency=10 Hz (indicated as underlined), (b) size=1 kB, and (c) time_cost=1 ms; and (iv) Node 12's attributes: (a) frequency=20 Hz, (b) size=2 kB, and (c) time_cost=2 ms.

In FIG. 9.4, by performing frequency backward propagation, the cache recommender assigns "view frequency" attribute to the view nodes (e.g., Nodes 3-6, 8, and 9). After performing the frequency backward propagation: (i) Node 3's attributes: (a) frequency=30 Hz (indicated as underlined), (b) size=100 KB, and (c) time_cost=10 ms; (ii) Node 4's attributes: (a) frequency=20 Hz (indicated as underlined), (b) size=5 kB, and (c) time_cost=8 ms; (iii) Node 5's attributes: (a) frequency=20 Hz (indicated as underlined), (b) size=1 kB, and (c) time_cost=2 ms; (iv) Node 6's attributes: (a) frequency=5 Hz (indicated as underlined), (b) size=1 MB, and (c) time_cost=1 ms; and (v) Node 9's attributes: (a) frequency=20 Hz (indicated as underlined), (b) size=50 KB, and (c) time_cost=3 ms.

Turning now to FIGS. 9.5-9.13, FIGS. 9.5-9.13 show "calculating the status of each node at each level and recommending one or more nodes" step of the example cache recommendation procedure. For the sake of brevity, not all details of the updating step may be discussed in FIGS. 9.5-9.13.

In FIG. 9.5, the cache recommender initializes status of "Level 1" nodes (e.g., Nodes 3-7) based on status variables. Assume here that: (i) Node 3's "updated" attributes: (a) frequency=30 Hz, (b) size=100 KB, (c) time_cost=10 ms, (d) remoteTran_size=100 KB (indicated as underlined), (e) latency=10 ms (indicated as underlined), and (f) reward=N/A; (ii) Node 4's "updated" attributes: (a) frequency=20 Hz, (b) size=5 kB, (c) time_cost=8 ms, (d) remoteTran_size=5 KB (indicated as underlined), (e) latency=8 ms (indicated as underlined), and (f) reward=N/A; (iii) Node 5's "updated" attributes: (a) frequency=20 Hz. (b) size=1 kB. (c) time_cost=2 ms, (d) remoteTran_size=1 kB (indicated as underlined), (e) latency=2 ms (indicated as underlined), and (f) reward=N/A; (iv) Node 6's "updated" attributes: (a) frequency=5 Hz, (b) size=1 MB, (c) time_cost=1 ms, (d) remoteTran_size=1 MB (indicated as underlined), (e) latency=1 ms (indicated as underlined), and (f) reward=N/A;

and (v) Node 7's "updated" attributes: (a) frequency=30 Hz, (b) size=0.1 kB, (c) time_cost=0.5 ms, (d) remoteTran_size=0.1 kB (indicated as underlined), (e) latency=0.5 ms (indicated as underlined), and (f) reward=N/A.

In FIG. 9.6, using $n_i \cdot reward = B_{time}(n_i \cdot freq \times n_i \cdot latency) + B_{tf}(n_i \cdot freq \times n_i \cdot remoteTran\_size)$, the cache recommender calculates each Level 1 node's reward. Accordingly, assume here that: (i) Node 3's updated attributes: (a) frequency=30 Hz, (b) size=100 KB, (c) time_cost=10 ms, (d) remoteTran_size=100 KB, (e) latency=10 ms, and (f) reward=$48/day (indicated as underlined); (ii) Node 4's "updated" attributes: (a) frequency=20 Hz. (b) size=5 kB. (c) time_cost=8 ms, (d) remoteTran_size=5 kB, (e) latency=8 ms, and (f) reward=$12.6/day (indicated as underlined); (iii) Node 5's "updated" attributes: (a) frequency=20 Hz, (b) size=1 kB, (c) time_cost=2 ms, (d) remoteTran_size=1 kB. (e) latency=2 ms, and (f) reward=$6.4/day (indicated as underlined); (iv) Node 6's "updated" attributes: (a) frequency=5 Hz. (b) size=1 MB, (c) time_cost=1 ms, (d) remoteTran_size=1 MB, (e) latency=1 ms, and (f) reward=$43.6/day (indicated as underlined); and (v) Node 7's "updated" attributes: (a) frequency=30 Hz, (b) size=0.1 kB, (c) time_cost=0.5 ms, (d) remoteTran_size=0.1 kB. (e) latency=0.5 ms, and (f) reward=$1.1/day (indicated as underlined).

In FIG. 9.7, based on the reward of each Level 1 node, the cache recommender provides a recommendation with respect to cacheable Level 1 nodes. As indicated, the cache recommender recommends Nodes 3 and 6 as "to be cached" nodes (indicated as dashed lines) because (i) a larger remoteTran_size indicates a higher priority of caching a corresponding node, (ii) longer latency indicates a higher priority of caching a corresponding node, and (iii) a higher reward indicates a higher priority of caching a corresponding node.

In FIG. 9.8, the cache recommender propagates latency of each of Level 1 nodes to corresponding Level 2 nodes (e.g., Nodes 8-10). Accordingly, assume here that: (i) Node 8's "updated" attributes: (a) frequency=30 Hz, (b) size=50 KB, (c) time_cost=2 ms, (d) remoteTran_size=N/A, (e) latency=2 ms (indicated as underlined), and (f) reward=N/A; (ii) Node 9's "updated" attributes: (a) frequency=20 Hz, (b) size=50 KB, (c) time_cost=3 ms, (d) remoteTran_size=N/A, (e) latency=11 ms (indicated as underlined), and (f) reward=N/A; and (iii) Node 10's "updated" attributes: (a) frequency=5 Hz, (b) size=1 MB, (c) time_cost=3 ms, (d) remoteTran_size=N/A, (e) latency=3 ms (indicated as underlined), and (f) reward=N/A.

In FIG. 9.9, the cache recommender propagates remoteTran_size of each of Level 1 nodes to the corresponding Level 2 nodes (e.g., Nodes 8-10). Accordingly, assume here that: (i) Node 8's updated attributes: (a) frequency=30 Hz, (b) size=50 kB, (c) time_cost=2 ms, (d) remoteTran_size=0 (indicated as underlined), (e) latency=2 ms, and (f) reward=N/A; (ii) Node 9's updated attributes: (a) frequency=20 Hz, (b) size=50 KB, (c) time_cost=3 ms, (d) remoteTran_size=6 kB (indicated as underlined), (e) latency=11 ms, and (f) reward=N/A; and (iii) Node 10's updated attributes: (a) frequency=5 Hz, (b) size=1 MB, (c) time_cost=3 ms, (d) remoteTran_size=0 (indicated as underlined), (e) latency=3 ms, and (f) reward=N/A.

In FIG. 9.10, based on $n_i \cdot reward = B_{time}(n_i \cdot freq \times n_i \cdot latency) + B_{tf}(n_i \cdot freq \times n_i \cdot remoteTran\_size)$, the cache recommender calculates each Level 2 node's reward. Accordingly, assume here that: Node 8's updated attributes: (a) frequency=30 Hz, (b) size=50 KB, (c) time_cost=2 ms, (d) remoteTran_size=0, (e) latency=2 ms, and (f) reward=$4.4/day (indicated as underlined); (ii) Node 9's updated attributes: (a) frequency=20 Hz, (b) size=50 kB, (c) time_cost=3 ms, (d) remoteTran_size=6 kB, (e) latency=11 ms, and (f) reward=$17.19/day (indicated as underlined); and (iii) Node 10's updated attributes: (a) frequency=5 Hz, (b) size=1 MB, (c) time_cost=3 ms, (d) remoteTran_size=0, (e) latency=3 ms, and (f) reward=$1.1/day (indicated as underlined).

In FIG. 9.11, based on the reward of each Level 2 node, the cache recommender provides a recommendation with respect to cacheable Level 2 nodes. As indicated, the cache recommender recommend Node 9 as "to be cached" node (indicated as dashed lines).

In FIG. 9.12, based on (i) $n_i \cdot latency = \max_{n_j \in n_i \cdot in}(n_j \cdot latency \times (1 - n_j \cdot cacheFlag)) + n_i \cdot time\_cost$ and (ii) $n_i \cdot remoteTran_{size} = \sum_{n_j \in n_i \cdot in}(n_j \cdot remoteTran_{size} \times (1 - n_j \cdot cacheFlag))$, the cache recommender propagates latency and remote data transfer size of each of Level 2 nodes to corresponding Level 3 nodes (e.g., Nodes 11 and 12). Accordingly, assume here that: (i) Node 11's updated attributes: (a) frequency=10 Hz, (b) size=1 kB, (c) time_cost=1 ms, (d) remoteTran_size=0 (indicated as underlined), (e) latency=3 ms (indicated as underlined), and (f) reward=N/A and (ii) Node 12's updated attributes: (a) frequency=20 Hz, (b) size=2 kB, (c) time_cost=2 ms, (d) remoteTran_size=0 (indicated as underlined), (e) latency=4 ms (indicated as underlined), and (f) reward=N/A.

In FIG. 9.13, based on $n_i \cdot reward = B_{time}(n_i \cdot freq \times n_i \cdot latency) + B_{tf}(n_i \cdot freq \times n_i \cdot remoteTran\_size)$, the cache recommender calculates each Level 3 node's reward. Accordingly, assume here that: (i) Node 11's updated attributes: (a) frequency=10 Hz, (b) size=1 kB, (c) time_cost=1 ms, (d) remoteTran_size=0, (e) latency=3 ms, and (f) reward=$2.2/day (indicated as underlined) and (ii) Node 12's updated attributes: (a) frequency=20 Hz, (b) size=2 kB, (c) time_cost=2 ms, (d) remoteTran_size=0, (e) latency=4 ms, and (f) reward=$5.8/day (indicated as underlined).

In FIG. 9.14, based on the "to be cached" nodes determined at each level, the cache recommender generates (in an ordered manner based on each node's attributes) the recommendation list, in which the list specifies: (i) Node 3 (and Node 3's attributes (including "cacheFlag=1")), (ii) Node 6 (and Node 6's attributes (including "cacheFlag=1")), and (iii) Node 9 (and Node 9's attributes (including "cacheFlag=1")). The cache recommender then presents the recommendation list to an administrator via the cache configuration interface.

End of Example

Turning now to FIG. 10, FIG. 10 shows a diagram of a computing device in accordance with one or more embodiments of the invention.

In one or more embodiments of the invention, the computing device (1000) may include one or more computer processors (1002), non-persistent storage (1004) (e.g., volatile memory, such as RAM, cache memory), persistent storage (1006) (e.g., a non-transitory computer readable medium, a hard disk, an optical drive such as a CD drive or a DVD drive, a Flash memory, etc.), a communication interface (1012) (e.g., Bluetooth interface, infrared interface, network interface, optical interface, etc.), an input device(s) (1010), an output device(s) (1008), and numerous other elements (not shown) and functionalities. Each of these components is described below.

In one or more embodiments, the computer processor(s) (1002) may be an integrated circuit for processing instructions. For example, the computer processor(s) (1002) may be one or more cores or micro-cores of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (e.g., a LAN, a WAN, Internet, mobile network, etc.) and/or to another device, such as another computing device.

In one or more embodiments, the computing device (1000) may include one or more output devices (1008), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data items, the method comprising:
obtaining a query log, wherein the query log is obtained at a first point-in-time,
wherein the query log specifies a query initiated by a user, an execution timestamp of the query that is related to a data item, an execution status of the query, an amount of a memory resource used to execute the query, an amount of a processor resource used to execute the query, a number of data items that are accessed within a period of time, an access frequency of a second data item that is accessed in an ad-hoc manner within the period of time, and a timestamp indicating when the data item is accessed;
initiating performance of a first recommendation cycle (RC) by analyzing the query log to generate a recommendation list (RL) comprising at least the data item with a high-level cache reward;
providing the RL to an administrator via a graphical user interface (GUI);
providing an administrator-confirmed recommendation list (ACRL) to a cache engine, wherein the ACRL is received from the administrator in response to the RL being provided to the administrator;
receiving a refreshment policy of the data item included in the ACRL from the administrator;
storing, based on the ACRL, the data item as a cached data item in a storage device;
at a second point-in-time:
refreshing the cached data item based on the refreshment policy;
receiving a query from a query engine specifying the data item, wherein the query engine has received the query from a user;
in response to the query, sending a response to the query engine indicating that the data item has already been stored in the storage device as the cached data item; and
providing the cached data item to the query engine, wherein, upon receiving the cached data item, the query engine initiates displaying of the cached data item to the user.

2. The method of claim 1, wherein generating the RL comprises:
obtaining a lineage topology, wherein the topology specifies historical data activities linked to the data item, and wherein the topology is generated based on historical query logs comprising the query log;
analyzing the topology to infer a plurality of data items included in the topology;
generating a graph model for the plurality of data items based on the analyzing;
assigning a topological attribute, a behavioral attribute, and a status variable to each data item of the plurality data items in the graph model, wherein each data item represents a view node of a plurality of view nodes in the graph model;
generating the RL based on the topological attribute, the behavioral attribute, and the status variable of each of the plurality of data items; and
storing the RL in the storage device in order to use the RL in a second RC after the first RC.

3. The method of claim 2, wherein a topological attribute of a view node of the plurality of view nodes is assigned after parsing the lineage topology, wherein the topological attribute of the view node specifies at least one selected from a group consisting of an identifier of the view node, a type of the view node, a level of the view node, a number of upstream nodes in the graph model associated with the view node, a number of downstream nodes in the graph model associated with the view node, an identifier of an upstream node of the upstream nodes, and an identifier of a downstream node of the downstream nodes.

4. The method of claim 2, wherein a behavioral attribute of a view node of the plurality of view nodes is assigned after analyzing the historical query logs, wherein the behavioral attribute of the view node specifies at least one selected from a group consisting of an amount of time required to execute the view node, a frequency of invokes associated with the view node, and a size of data resulting from execution of the view node.

5. The method of claim 2, wherein the status variable of a view node of the plurality of view nodes specifies at least one selected from a group consisting of a size of data to be transferred from a remote source node in the graph model, an amount of latency that the user will experience when accessing the view node, a cache reward level of the view node, a second cache reward level of the view node in a third RC before the first RC, and a cache flag indicating a status of the view node.

6. The method of claim 2,
wherein, after parsing the historical query logs, an access pattern of the plurality of data items over a period of time is obtained, and
wherein the access pattern specifies that the data item is accessed at a first frequency and the second data item is accessed at a second frequency.

7. The method of claim 1,
wherein the RL specifies a plurality of data items that needs to be cached in the storage device,
wherein the data item is one of the plurality of data items,
wherein, after receiving a confirmation from the administrator with respect to the RL, the data item is stored in the storage device as the cached data item until a second RC is initiated, and
wherein, when a previously cached data item is not specified in the RL, the previously cached data item is removed from the storage device.

8. The method of claim 7, wherein, to prevent data communication traffic overhead with a remote database, the RL is generated by considering previously cached data items related to a third RC before the first RC.

9. The method of claim 1,
wherein, after the RL is provided to the administrator, the administrator sorts the data item and a second data item included in the RL for caching based on the data item's cache reward level and the second data item's cache reward level,
wherein, after sorting the RL, the administrator compares the data item's priority level against the second data item's priority level, and
wherein, based on the comparison, the administrator confirms the RL to initiate generation of the ACRL.

10. The method of claim 9, wherein the comparison indicates that a larger size of data needs to be transferred from a remote source for the data item and that makes the data item a high-priority data item for caching.

11. The method of claim 1, wherein the data item is a view or a result of an executed query, wherein the view is a virtual table whose contents are defined by the query.

12. A method for managing a data item, the method comprising:
obtaining a query log, wherein the query log is obtained at a first point-in-time,
wherein the query log specifies a query initiated by a user, an execution timestamp of the query that is related to the data item, an execution status of the query, an amount of a memory resource used to execute the query, an amount of a processor resource used to execute the query, a number of data items that are accessed within a period of time, an access frequency of a second data item that is accessed in an ad-hoc manner within the period of time, and a timestamp indicating when the data item is accessed;
initiating performance of a first recommendation cycle (RC) by analyzing the query log to generate a recommendation list (RL) comprising at least the data item with a high-level cache reward, wherein the RL is generated using a least frequently used (LFU) cache model or a least recently used (LRU) cache model;
providing the RL to an administrator via a graphical user interface (GUI);
providing an administrator-confirmed recommendation list (ACRL) to a cache engine, wherein the ACRL is received from the administrator in response to the RL being provided to the administrator;
receiving a refreshment policy of the data item included in the ACRL from the administrator;
storing, based on the ACRL, the data item as a cached data item in a storage device;
at a second point-in-time:
refreshing the cached data item based on the refreshment policy;
receiving a query from a query engine specifying the data item, wherein the query engine has received the query from a user;
in response to the query, sending a response to the query engine indicating that the data item has already been stored in the storage device as the cached data item; and
providing the cached data item to the query engine, wherein, upon receiving the cached data item, the query engine initiates displaying of the cached data item to the user.

13. The method of claim 12, wherein the query engine initiates displaying of the cached data item to the user via a second GUI.

14. The method of claim 12,
wherein the RL specifies a plurality of data items that need to be cached in the storage device,
wherein, after receiving a confirmation from the administrator with respect to the RL, the data item is stored in the storage device as the cached data item until a second RC is initiated, and
wherein, when a previously cached data item is not specified in the RL, the previously cached data item is removed from the storage device.

15. A method for managing data items, the method comprising:
obtaining a query log and a lineage topology, wherein the query log and the lineage topology are obtained at a first point-in-time,
wherein the query log specifies a query initiated by a user, an execution timestamp of the query that is related to a data item, an execution status of the query, an amount of a memory resource used to execute the query, an amount of a processor resource used to execute the query, a number of data items that are accessed within a period of time, an access frequency of a second data item that is accessed in an ad-hoc manner within the period of time, and a timestamp indicating when the data item is accessed;
analyzing the query log and the lineage topology to infer a plurality of data items in the topology;
generating a graph model for the plurality of data items based on the analyzing;
assigning a topological attribute, a behavioral attribute, and a status variable to each data item of the plurality of data items in the graph model, wherein the data item of the plurality of data items with a high-level cache reward represents a view node in the graph model;
determining a refreshment policy of the data item based on the analyzing;
storing the data item as a cached data item in a storage device based on a topological attribute, a behavioral attribute, and a status variable of the data item;
at a second point-in-time:
refreshing the cached data item based on the refreshment policy;

receiving a query from a query engine specifying the data item, wherein the query engine has received the query from a user;

in response to the query, sending a response to the query engine indicating that the data item has already been stored in the storage device as the cached data item; and provide the cached data item to the query engine, wherein, upon receiving the cached data item, the query engine initiates displaying of the cached data item to the user.

16. The method of claim 15, wherein the topology specifies historical data activities linked to the data item, and wherein the topology is generated based on historical query logs comprising the query log.

17. The method of claim 15, wherein the topological attribute of the view node is assigned after parsing the lineage topology, wherein the topological attribute of the view node specifies at least one selected from a group consisting of an identifier of the view node, a type of the view node, a level of the view node, a number of upstream nodes in the graph model associated with the view node, a number of downstream nodes in the graph model associated with the view node, an identifier of an upstream node of the upstream nodes, and an identifier of a downstream node of the downstream nodes.

18. The method of claim 15, wherein the behavioral attribute of the view node is assigned after analyzing historical query logs comprising the query log, wherein the behavioral attribute of the view node specifies at least one selected from a group consisting of an amount of time required to execute the view node, a frequency of invokes associated with the view node, and a size of data resulting from execution of the view node.

19. The method of claim 15, wherein the status variable of the view node specifies at least one selected from a group consisting of a size of data to be transferred from a remote source node in the graph model, an amount of latency that the user will experience when accessing the view node, a cache reward level of the view node, and a cache flag indicating a status of the view node.

20. The method of claim 15, wherein the data item is a view or a result of an executed query, wherein the view is a virtual table whose content is defined by the query.

* * * * *